US009881120B1

(12) United States Patent
Ginetti et al.

(10) Patent No.: US 9,881,120 B1
(45) Date of Patent: Jan. 30, 2018

(54) METHOD, SYSTEM, AND COMPUTER PROGRAM PRODUCT FOR IMPLEMENTING A MULTI-FABRIC MIXED-SIGNAL DESIGN SPANNING ACROSS MULTIPLE DESIGN FABRICS WITH ELECTRICAL AND THERMAL ANALYSIS AWARENESS

(71) Applicant: Cadence Design Systems, Inc., San Jose, CA (US)

(72) Inventors: Arnold Ginetti, Antibes (FR); Steven Durrill, Campbell, CA (US); Taranjit Singh Kukal, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 117 days.

(21) Appl. No.: 14/871,735

(22) Filed: Sep. 30, 2015

(51) Int. Cl.
G06F 17/50 (2006.01)
G06F 7/76 (2006.01)
G06F 1/26 (2006.01)
G06F 15/78 (2006.01)

(52) U.S. Cl.
CPC ...... G06F 17/5081 (2013.01); G06F 17/5077 (2013.01); G06F 1/266 (2013.01); G06F 7/76 (2013.01); G06F 15/7867 (2013.01); G06F 17/505 (2013.01); G06F 17/5054 (2013.01)

(58) Field of Classification Search
CPC .......... G06F 1/26; G06F 1/266; G06F 17/505; G06F 15/7867; G06F 17/5054; G06F 17/5081; G06F 17/5077
See application file for complete search history.

(56) References Cited

U.S. PATENT DOCUMENTS

| 4,457,027 A | 7/1984 | Gladstone |
| 5,396,435 A | 3/1995 | Ginetti |
| 5,426,591 A | 6/1995 | Ginetti et al. |
| 5,633,803 A | 5/1997 | Silve et al. |

(Continued)

OTHER PUBLICATIONS

Kahng et al.; "Improved on-chip router analytical power and area modeling"; Year: 2010; 2010 15th Asia and South Pacific Design Automation Conference (ASP-DAC); pp. 241-246.*

(Continued)

Primary Examiner — Helen Rossoshek
(74) Attorney, Agent, or Firm — Vista IP Law Group, LLP

(57) ABSTRACT

Various embodiments implementing a multi-fabric mixed-signal electronic system design spanning across multiple design fabrics with electrical and/or thermal analysis awareness. A schematic design may be extracted from and a power delivery network (PDN) model may be determined from a plurality of layouts in multiple design fabrics in a multi-fabric design environment platform. A PDN-aware, multi-fabric full system schematic may be constructed by assembling the PDN model and the schematic design into the PDN-aware, multi-fabric full system schematic. For a schematic generated for a circuit block of interest, chip power models may be determined for the remaining portion of the multi-fabric mixed-signal electronic system design, and the PDN-aware, multi-fabric full system schematic may be updated by accounting for the chip power models. The circuit block of interest may then be electrically and/or thermally analyzed within the context of the remaining portion.

20 Claims, 13 Drawing Sheets

(56) References Cited

U.S. PATENT DOCUMENTS

| | | | |
|---|---|---|---|
| 5,638,290 | A | 6/1997 | Ginetti et al. |
| 5,726,902 | A | 3/1998 | Mahmood et al. |
| 5,751,596 | A | 5/1998 | Ginetti et al. |
| 5,764,525 | A | 6/1998 | Mahmood et al. |
| 5,825,658 | A | 10/1998 | Ginetti et al. |
| 5,841,663 | A | 11/1998 | Sharma et al. |
| 5,896,299 | A | 4/1999 | Ginetti et al. |
| 5,956,257 | A | 9/1999 | Ginetti et al. |
| 6,086,621 | A | 7/2000 | Ginetti et al. |
| 6,113,647 | A | 9/2000 | Silve et al. |
| 6,145,117 | A | 11/2000 | Eng |
| 6,170,080 | B1 | 1/2001 | Ginetti et al. |
| 6,353,612 | B1 | 3/2002 | Zhu |
| 6,378,116 | B1 | 4/2002 | Ginetti |
| 6,401,128 | B1 | 6/2002 | Stai |
| 6,405,345 | B1 | 6/2002 | Ginetti |
| 6,519,743 | B1 | 2/2003 | Nauts et al. |
| 6,622,290 | B1 | 9/2003 | Ginetti et al. |
| 6,622,291 | B1 | 9/2003 | Ginetti |
| 7,143,341 | B1 | 11/2006 | Kohli |
| 7,168,041 | B1 | 1/2007 | Durrill et al. |
| 7,257,799 | B2 | 8/2007 | McKenney |
| 7,350,164 | B2* | 3/2008 | Xu .................. G06F 17/5063 716/122 |
| 7,468,982 | B2 | 12/2008 | Mehra |
| 7,490,309 | B1 | 2/2009 | Gonzalesz et al. |
| 7,555,739 | B1 | 6/2009 | Ginetti et al. |
| 7,634,743 | B1 | 12/2009 | Ginetti |
| 7,711,767 | B2* | 5/2010 | Agrawal ............ H04L 41/145 709/200 |
| 7,779,286 | B1 | 8/2010 | Pritchard |
| 7,802,221 | B1 | 9/2010 | Brink |
| 7,949,987 | B1 | 5/2011 | Ginetti et al. |
| 7,971,175 | B2 | 6/2011 | Ginetti |
| 7,971,178 | B1 | 6/2011 | Marwah et al. |
| 7,990,375 | B2 | 8/2011 | Kohli et al. |
| 8,046,730 | B1 | 10/2011 | Ferguson et al. |
| 8,136,071 | B2 | 3/2012 | Solomon |
| 8,145,458 | B1 | 3/2012 | Kukal et al. |
| 8,191,035 | B1 | 5/2012 | Van Brink |
| 8,255,845 | B2 | 8/2012 | Ginetti |
| 8,261,228 | B1 | 9/2012 | Gopalakrishnan et al. |
| 8,271,933 | B1 | 9/2012 | Kohli et al. |
| 8,281,272 | B1 | 10/2012 | Ginetti |
| 8,286,025 | B1 | 10/2012 | Pritchard |
| 8,286,110 | B1 | 10/2012 | Kukal et al. |
| 8,316,337 | B2 | 11/2012 | Bhattacharya et al. |
| 8,316,342 | B1 | 11/2012 | Kukal et al. |
| 8,347,261 | B2 | 1/2013 | Ginetti et al. |
| 8,364,656 | B2 | 1/2013 | Arora et al. |
| 8,438,524 | B1 | 5/2013 | Kohli et al. |
| 8,452,582 | B1 | 5/2013 | Al-Hawari et al. |
| 8,453,136 | B1 | 5/2013 | Hahn et al. |
| 8,479,134 | B2 | 7/2013 | Bhattacharya et al. |
| 8,521,483 | B1 | 8/2013 | Kukal et al. |
| 8,527,929 | B2* | 9/2013 | Bhattacharya ...... G06F 17/5077 716/126 |
| 8,527,934 | B2 | 9/2013 | Ginetti et al. |
| 8,566,767 | B1 | 10/2013 | Kukal et al. |
| 8,594,988 | B1 | 11/2013 | Spyrou et al. |
| 8,595,671 | B2* | 11/2013 | He .................... G06F 17/5054 716/116 |
| 8,631,181 | B2 | 1/2014 | Feehrer |
| 8,645,894 | B1 | 2/2014 | Kukal et al. |
| 8,656,329 | B1 | 2/2014 | Kukal et al. |
| 8,719,754 | B1 | 5/2014 | Ginetti |
| 8,732,636 | B2 | 5/2014 | Ginetti et al. |
| 8,732,651 | B1 | 5/2014 | Kukal et al. |
| 8,762,906 | B2 | 6/2014 | Ginetti et al. |
| 8,769,455 | B1 | 7/2014 | Singh et al. |
| 8,806,405 | B2 | 8/2014 | Colwell |
| 8,898,039 | B1 | 11/2014 | Kukal et al. |
| 8,910,100 | B1 | 12/2014 | Wilson et al. |
| 8,930,878 | B1 | 1/2015 | Leef |
| 9,165,931 | B1* | 10/2015 | Schmit .................. H01L 27/115 |
| 9,223,915 | B1* | 12/2015 | Ginetti ................ G06F 17/5022 |
| 9,280,621 | B1* | 3/2016 | Ginetti ................ G06F 17/5022 |
| 9,348,960 | B1* | 5/2016 | Ginetti ................ G06F 17/5022 |
| 9,361,415 | B1* | 6/2016 | Ginetti ................ G06F 17/5022 |
| 9,449,130 | B1* | 9/2016 | Kukal .................. G06F 17/5022 |
| 2003/0051222 | A1 | 3/2003 | Williams et al. |
| 2003/0196182 | A1 | 10/2003 | Hahn |
| 2004/0034842 | A1 | 2/2004 | Mantey |
| 2004/0156322 | A1 | 8/2004 | Mehra |
| 2005/0273732 | A1 | 12/2005 | Xu |
| 2006/0111884 | A1 | 5/2006 | McGaughy et al. |
| 2006/0288323 | A1 | 12/2006 | Birch |
| 2007/0229537 | A1 | 10/2007 | Kohli et al. |
| 2008/0094102 | A1* | 4/2008 | Osann ................ G06F 9/30145 326/39 |
| 2008/0301600 | A1 | 12/2008 | Kumagai |
| 2009/0007031 | A1 | 1/2009 | Ginetti et al. |
| 2010/0031209 | A1 | 2/2010 | Luan et al. |
| 2010/0115207 | A1 | 5/2010 | Arora et al. |
| 2010/0306729 | A1 | 12/2010 | Ginetti |
| 2011/0041106 | A1 | 2/2011 | Li et al. |
| 2011/0061034 | A1 | 3/2011 | Ginetti et al. |
| 2011/0153288 | A1 | 6/2011 | Bhattacharya et al. |
| 2011/0153289 | A1 | 6/2011 | Bhattacharya et al. |
| 2011/0154276 | A1 | 6/2011 | Bhattacharya et al. |
| 2011/0161899 | A1 | 6/2011 | Ginetti et al. |
| 2011/0161900 | A1 | 6/2011 | Ginetti et al. |
| 2011/0173582 | A1 | 7/2011 | Bhattacharya et al. |
| 2012/0047434 | A1 | 2/2012 | Ginetti |
| 2012/0068229 | A1* | 3/2012 | Bemanian ............ H01L 25/0652 257/209 |
| 2013/0097572 | A1 | 4/2013 | Ginetti et al. |
| 2013/0246900 | A1 | 9/2013 | Ginetti et al. |
| 2013/0290834 | A1 | 10/2013 | Ginetti et al. |
| 2014/0103959 | A1* | 4/2014 | Andreev ........ H03K 19/018585 326/41 |
| 2014/0103985 | A1* | 4/2014 | Andreev ................ H03K 5/131 327/262 |
| 2014/0123094 | A1 | 5/2014 | Colwell et al. |
| 2014/0223402 | A1 | 8/2014 | Satou |

OTHER PUBLICATIONS

Hon-Chi Ng, "Cpr E 305 Laboratory Tutorial ¾ Verilog Syntax: Summary of Verilog Syntax" Last Updated: Feb. 7, 2001.

Stuart Sutherland, "Verilog HDL: Quick Reference Guide" 2001.

"Summary of Verilog Syntax" URL: http://www.verilogtutorial.info/chapter_3.htm, 2007, Accessed on Sep. 2, 2014.

Non-Final Office Action dated Apr. 13, 2015 for U.S. Appl. No. 14/503,408.

Non-Final Office Action dated Apr. 16, 2015 for U.S. Appl. No. 14/503,407.

Notice of Allowance dated Aug. 21, 2015 for U.S. Appl. No. 14/503,406.

Notice of Allowance dated Oct. 28, 2015 for U.S. Appl. No. 14/503,407.

Notice of Allowance dated Oct. 29, 2015 for U.S. Appl. No. 14/503,408.

Ex-parte Quayle Action dated Nov. 2, 2015 for U.S. Appl. No. 14/503,404.

Notice of Allowance dated Jan. 22, 2016 for U.S. Appl. No. 14/503,404.

Ex-parte Quayle Action dated Nov. 27, 2015 for U.S. Appl. No. 14/503,404.

Notice of Allowance dated Feb. 9, 2016 for U.S. Appl. No. 14/503,404.

Non-Final Office Action dated Mar. 27, 2017 for U.S. Appl. No. 14/754,535.

"Application Note: Best Practices for S-Parameter Extraction to Improve Time-Domain Convergence with Allegro Sigrity Tools", Cadence Design Systems, Inc., Nov. 2013.

"Guidelines for Robust S-Parameter Model Development Application Note, Product Version 15.2", Cadence Design Systems, Inc., Jun. 2004.

(56) References Cited

OTHER PUBLICATIONS

Creech, Joseph. "S-Parameters Allow High-Frequency Verification of RF Switch Models." Analog Dialogue 45.10 (2011): 1-4.
Ex-parte Quayle Action dated Aug. 21, 2017 for U.S. Appl. No. 15/205,593.
Notice of Allowance dated Sep. 20, 2017 for U.S. Appl. No. 14/754,535.
Notice of Allowance dated Nov. 22, 2017 for U.S. Appl. No. 15/205,593.

* cited by examiner

METHOD, SYSTEM, AND COMPUTER PROGRAM PRODUCT FOR IMPLEMENTING A MULTI-FABRIC MIXED-SIGNAL DESIGN SPANNING ACROSS MULTIPLE DESIGN FABRICS WITH ELECTRICAL AND THERMAL ANALYSIS AWARENESS

CROSS-REFERENCE TO RELATED PATENT APPLICATIONS

This application is cross related to U.S. patent application Ser. No. 14/503,403, now U.S. Pat. No. 9,351,415, filed on Oct. 1, 2014 and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,408, now U.S. Pat. No. 9,286,461, filed on Oct. 1, 2014 and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,404, now U.S. Pat. No. 9,348,960, filed on Oct. 1, 2014 and entitled "METHODS, SYSTEMS, AND ARTICLES OF MANUFACTURE FOR PROBING OR NETLISTING A MULTI-FABRIC ELECTRONIC DESIGN SPANNING ACROSS MULTIPLE DESIGN FABRICS", U.S. patent application Ser. No. 14/503,406, now U.S. Pat. No. 9,223,915, filed on Oct. 1, 2014 and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS", and U.S. patent application Ser. No. 14/503,407, now U.S. Pat. No. 9,280,621, filed on Oct. 1, 2014 and entitled "METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS". The contents of the aforementioned U.S. provisional patent application and U.S. patent applications are hereby incorporated by reference in their respective entireties for all purposes.

BACKGROUND

In conventional electronic designs, the integrated circuits (ICs), the IC packaging, and the printed circuit boards are often developed and designed independently. Modern electronic designs often require or desire developing the integrated circuit, the their respective packaging, and the printed circuit board (PCB) incorporating multiple packaged integrated circuits in a multi-fabric environment. That is, one designer may need or desire to design in the context of the others. For example, an integrated circuit designer may need or desire to implement the integrated circuit design in view of the contexts of the packaging fabric as well as the printed circuit board fabric.

Similarly, a printed circuit board designer may need or desire to implement or tune the printed circuit design in the context of the packaging design fabric and/or the integrated circuit design fabric. As a practical example where an advanced package is to be integrated into a printed circuit board (PCB) for an electronic product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

A power distribution network (or power delivery network or PDN) includes the circuit components, traces, and/or metal structures that deliver power not only to the device under test but also to various other devices in an entire electronic design including one or more packaged integrated circuits, cells, discrete circuit components, and traces. Although early rail analyses and power grid implementations and optimizations may provide reasonably accurate results, IC packages and the printed circuit board itself may often cause additional drop in the power distribution network before the supplied power enters the power grid of integrated circuits or cells.

Furthermore, a power distribution network for a system under test may be loaded by the entire system, and such a load by the entire system may impact power delivery to individual integrated circuits and cells. Conventional I/O (input/output) drop analyses often assume an ideal voltage on all the power pads of an integrated circuit. This assumption is far from reality where voltages on different power pads of an integrated circuit may not necessarily be the same, much less having the same ideal voltage, due to, for example, lack of system symmetry, the dissipation within the power distribution network, consumption by other circuit components, etc.

With mixed-signal electronic designs, the voltage drop (IR drop) of an analog block or die needs system driven simulations. This system driven simulation that needs the visibility of the complete circuit of at least the analog block or die is in sharp contrast with digital dies or cells that may operate and be analyzed with test vectors. Conventional approaches require manual construction of the system under test to simulate the system including analog or mixed-signal dies. Some of these approaches also perform a single analog die electro-migration and/or IR-drop (EMIR) analysis by assuming ideal voltages at the pads of the single analog or mixed-signal die and require manual stitching between, for example, an IC package and the PDN model interface for the analog die. For example, conventional approaches require manual stitching between the Vdd pad of an IC die and the corresponding supply in the PDN model. These approaches often fail to accommodate the power consumption or dissipation of the package—PCB interface power distribution network in the power consumption or dissipation of the entire system. Moreover, these conventional approach are often, if not always, performed at non-schematic levels.

In addition to the imprecise or inaccurate power consumption and/or power dissipation results, conventional thermal analyses of a system often do not account for Joule heating of surrounding circuit components. Some approaches even use power dissipation data of various circuit components from data sheets that are generated for worst-case scenarios. Some approaches uses root mean square (RMS) or average power dissipation data and thus cannot capture transient or instantaneous thermal behavior. Many conventional approaches also fail to account for capacitances and inductors in thermal analyses.

Therefore, there exists a need for methods and apparatuses for implementing a multi-fabric mixed-signal electronic design spanning across multiple design fabrics with electrical and thermal analysis awareness.

SUMMARY

Disclosed are method(s), system(s), and article(s) of manufacture for implementing a multi-fabric mixed-signal electronic design spanning across multiple design fabrics with electrical and thermal analysis awareness in one or more embodiments. Some embodiments are directed at a method for multi-fabric mixed-signal electronic design spanning across multiple design fabrics with electrical and thermal analysis awareness. In these embodiments, a schematic design may be extracted, at a plurality of extraction mechanisms or modules at least partially stored in memory and functioning in conjunction with one or more computer processors, from a plurality of layouts in multiple design fabrics in a multi-fabric design environment platform; a power delivery network (PDN) model may be determined from the plurality of layouts; and a PDN-aware, multi-fabric full system schematic may be constructed by assembling the power delivery network model and the schematic design into the PDN-aware, multi-fabric full system schematic.

For extracting the schematic design, an IC package layout or a PCB layout may be identified from the plurality of layouts; an analog or mixed-signal circuit block of interest; and the schematic design for the analog or mixed-signal circuit block of interest may then be extracted from the IC package layout or the PCB layout in the plurality of layouts. An analog or mixed-signal circuit block of interest may be the subject of various analyses within the context of the multi-fabric mixed-signal electronic system design.

In some of these embodiments, a remaining portion of the multi-fabric mixed-signal electronic system design may be identified for a system that excludes the analog or mixed-signal circuit block of interest; and one or more chip power models may be determined for the remaining portion of the multi-fabric mixed-signal electronic system design of the system. In addition or in the alternative, the PDN-aware, multi-fabric full system schematic may be generated or updated by further assembling the one or more chip power models into the multi-fabric mixed-signal electronic system design of the system. Optionally, connectivity information may also be extracted from the IC package layout or the PCB layout in the plurality of layouts; and the PDN-aware, multi-fabric full system schematic may be generated or updated by guiding an assembly of the power delivery network model and the schematic design into the multi-fabric mixed-signal electronic system design of the system using the connectivity information extracted from the IC package layout or the PCB layout in the plurality of layouts.

In some embodiments, an electrical analysis layout may be identified from the plurality of layouts; one or more input/output (I/O) nets and one or more signal nets coupled to power or ground may also be identified from the electrical analysis layout; and the power delivery network (PDN) model may be determined from the electrical analysis layout by constructing a simulation model that accounts for the one or more I/O nets and electromagnetic coupling effects between the one or more signal nets and power and/or ground. In addition or in the alternative, analysis results may be generated by performing, at a schematic analysis or simulation mechanism or module, one or more system driven analyses on the PDN-aware, multi-fabric full system schematic; the analysis results may be stored at a first location of a non-transitory computer accessible storage medium as the analysis results are being generated or in one or more batches; a revised multi-fabric mixed-signal electronic system design may be generated by revising the multi-fabric mixed-signal electronic system design with one or more electronic design automation (EDA) tools that natively process design data in one or more corresponding design fabrics; and the revised multi-fabric mixed-signal electronic system design may also be stored into one or more relational databases in one or more atomic transactions.

In addition or in the alternative, a PCB level or system level design may be identified for the multi-fabric mixed-signal electronic system design; one or more thermal models may be identified (if already existing) or constructed (if not yet existing) from the PCB level or system level design; and the PDN-aware, multi-fabric full system schematic may be generated (if not yet existing) or updated (if already existing) by further assembling the one or more thermal models into the PDN-aware, multi-fabric full system schematic. In some of these embodiments, electrical analysis results may be generated by performing, at a schematic analysis or simulation mechanism or module, one or more system driven electrical analyses on the PDN-aware, multi-fabric full system schematic that accounts for the one or more thermal models; the electrical analysis results may then be stored at a first location of a non-transitory computer accessible storage medium as they are being generated or in one or more batches; a first revised multi-fabric mixed-signal electronic system design may be generated by revising the multi-fabric mixed-signal electronic system design with one or more electronic design automation (EDA) tools that natively process design data in one or more corresponding design fabrics based in part or in whole upon the electrical analysis results; and the revised multi-fabric mixed-signal electronic system design may be stored into one or more relational databases in one or more atomic database transactions.

In addition or in the alternative, at least a part of the electrical analysis results may be forwarded to a thermal analysis mechanism or module; the PDN-aware, multi-fabric full system schematic may be updated accounting for the one or more thermal models based in part or in whole upon the at least the part of the electrical analysis results; thermal analysis results may be generated by performing, at a schematic analysis or simulation mechanism or module, one or more system driven thermal analyses on the PDN-aware, multi-fabric full system schematic that accounts for the one or more thermal models; and the thermal analysis results may be stored at a second location of a non-transitory computer accessible storage medium as these thermal analysis results are being generated or in one or more batches.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
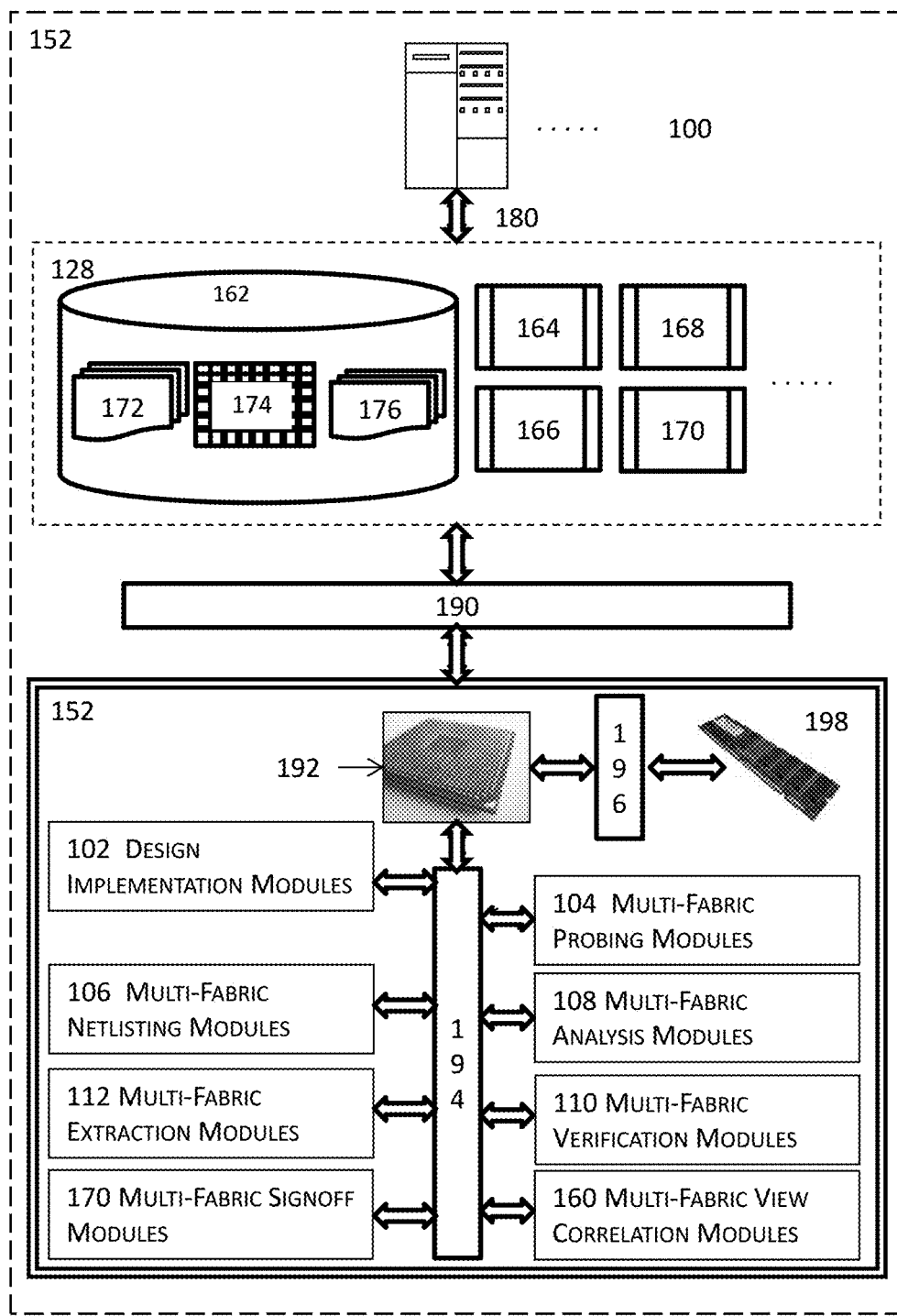
FIG. 1A illustrates a high level block diagram for implementing a multi-fabric mixed-signal electronic design spanning across multiple design fabrics with electrical and/or thermal analysis awareness in some embodiments.

Various embodiments of the invention are directed to methods, systems, and articles of manufacture for implementing a multi-fabric mixed-signal electronic design spanning across multiple design fabrics with electrical and/or thermal analysis awareness. Other objects, features, and advantages of the invention are described in the detailed description, figures, and claims. It shall be noted that both the term "multi-fabric" and the term "cross-fabric" refer to the same scenario where an electronic design or a portion thereof crosses more than one design fabric throughout the entire application. It shall also be noted that all the terms preceded with "multi-fabric" in the U.S. patent applications in the section entitled "CROSS-REFERENCE TO RELATED PATENT APPLICATIONS" may also be preceded with "cross-fabric".

In some embodiments, these methods or apparatuses described herein automatically create a system schematic, which is made aware of the power distribution network model aware, from the system layout including circuit components like, for example, the PCB, one or more IC packages, discrete devices, traces, etc. together with the power distribution network model that supplies power to these circuit components requiring power inputs. More specifically, these methods or apparatuses utilize a multi-fabric design environment (or multi-fabric design environment) to process design data from multiple design fabrics (e.g., the PCB design fabric, the IC package design fabric, and the IC design fabric, etc.) by using a plurality of electronic design automation (EDA) tools that natively process respective data that are native to the corresponding EDA tools. Throughout the entire description of this application, the term "PDN aware system schematic" or even the term "system schematic" may refer to a multi-fabric PDN aware system schematic or a multi-fabric PDN aware and thermal aware system schematic, depending upon the context (e.g., electrical or thermal) in which the "system schematic" is used, unless otherwise specifically recited in the description or the claims.

The power distribution network model aware system schematic may be generated in such a way that designers may utilize any EDA tools (e.g., an IC schematic and layout tool) specific to one or more design fabrics to perform various other tasks such as modifications, analyses, simulations, optimizations, closure, sign-off, etc. with the power distribution network model aware system schematic. In the power distribution network model aware system schematic for a specific design fabric (e.g., an IC design fabric), design data from one or more other design fabrics (e.g., IC design data in the IC design fabric, IC packaging design data in the IC packaging design fabric, etc.) may be represented as one or more symbolic views each having or associated with the connectivity information to interface with design data in the specific design fabric.

For example, a PCB and one or more IC packages may be respectively represented as symbolic views in the IC design fabric. Similarly, the IC design data and the PCB design may also be respectively represented as symbolic views in the layout or schematic of the IC package design fabric; and the IC design data and the IC package design data may further be represented as symbolic views in the layout or schematic of the PCB design fabric.

This automatically created system schematic includes the instances or views of various circuit components from multiple design fabrics and may be used as a part of an input for further electro-migration and/or IR-drop (EMIR) analyses of analog blocks or cells within the context of one or more chip power models generated from electro-migration and/or IR-drop (EMIR) analyses of other digital, analog, or mixed-signal blocks in the system in a context of electrical-thermal co-simulation.

These one or more chip power models that are generated as a part of electro-migration and/or IR-drop (EMIR) analyses may also be used to determine various electrical characteristics (e.g., power dissipation of IC dies, blocks, cells, or other circuit components, pin currents, etc.) of the system in some embodiments; and these electrical characteristics may further be used in thermal analyses of the system across multiple design fabrics including, for example, the PCB design fabric, IC package design fabric, IC design fabric, or any combinations thereof. In addition or in the alternative, a chip power model may include one or more switching current profiles for time-domain or transient analyses whose results may further guide the sizes, designs, and/or placement of capacitors and/or inductors in various design fabrics.

In some embodiments, the automatically created system schematic may be used for further analyses or simulations within the context of electrical-thermal co-simulation. For example, a multi-fabric system schematic may be generated by using a multi-fabric design environment and one or more parasitic extractors to generate electrical simulation results that include, for example, currents, voltages, power dissipation, etc. Another multi-fabric thermal aware system schematic may also be generated with the multi-fabric design environment and thermal models including, for example, s-parameter models, thermal RC (resistance capacitance) models, etc. of various circuit elements. This multi-fabric thermal aware system schematic may be generated for, for example, an IC schematic and layout suite to leverage the extensive suite of various analysis and simulation tools that have been developed the IC schematic and layout tool.

The electrical simulation results obtained from performing analyses and/or simulations on the multi-fabric system schematic may be used as inputs to the multi-fabric thermal aware system schematic for thermal analyses or simulations in some embodiments. For example, the pin currents and power dissipation of various circuit elements obtained from the electrical simulations or analyses may be provided to a thermal analysis or simulation tool that operates upon the multi-fabric thermal aware system schematic to generate thermal analysis results. The thermal analysis results may be further provided back to, for example, update or back annotate the parasitics and/or to update the electrical analyses or simulations with the multi-fabric system schematic.

One of the advantages of these methods and apparatuses is that the additional voltage drops caused by, for example, IC packages and/or PCB in the power distribution network before the supplied power is provided to the power grid of an IC die are more accurately accommodated from various electrical and/or thermal analyses, instead of from data sheets which usually contain data values for worst case scenarios. These methods and apparatuses employ the more accurately modeled PDN as well as the results of various static and/or transient analyses and/or simulations to avoid implementations of electronic designs based on such worst case scenarios that are often unnecessary and prohibitively expensive with marginal return in performance and reliability benefits without compromising the needs for understanding of various failure scenarios or impacts of such failure scenarios.

Another advantage is that the loading from the entire system under test or device under test on the power distribution network is also more accurately accounted for during various electrical and/or thermal analyses or simulations, and thus more accurate power supplied into devices (e.g., an IC die) may also be captured. By accounting for the loading from the entire system, electrical characteristics (e.g., currents, voltages, power consumption, etc.) may be more accurately captured through various circuit elements in the system supplied by the power distribution network.

Another advantage is that the analog block electro-migration and/or IR-drop (EMIR) analyses, which require system driven simulation rather than test vectors for digital blocks (e.g., switching a digital die using test vectors), may be more accurately performed within the context of surrounding digital, mixed-signal, or analog blocks, rather than being analyzed as a single, analog die outside the context of surrounding circuit elements. The electrical analyses and thermal analyses are no longer limited to analyses of a single die. Rather, electrical and/or thermal analyses are performed for circuit devices or blocks within the contexts of surrounding blocks or devices. In addition, the electrical analyses and thermal analyses are no longer limited to analyses at non-schematic level. Rather, electrical analyses and thermal analyses of a system or a portion thereof including an analog or mixed-signal block may be performed at the schematic level using the multi-fabric PDN aware system schematic that may be automatically generated with various techniques described herein.

For example, to perform an electro-migration and/or IR-drop (EMIR) analysis for an analog die under test, some of these methods and apparatuses may generate one or more chip power models for one or more digital, analog, and/or mixed-signal blocks by performing one or more electro-migration and/or IR-drop (EMIR) analyses. A chip power model for an analog or mixed-signal die or block may further be generated from the layout of the analog die under test. A multi-fabric PDN aware system schematic may then be generated by using the cross fabric design environment, the chip power model for the analog or mixed-signal die or block under test, and the one or more chip power models for the one or more digital, analog, and/or mixed-signal blocks. Electro-migration and/or IR-drop (EMIR) analyses may then be performed for the analog or mixed-signal die or block under test with the multi-fabric PDN aware system schematic that accounts for the loading from the entire system. The analysis results may further be used in concurrent or subsequent electrical or thermal analyses.

Another advantage is that electrical characteristics of a system (e.g., voltages, pin currents, power dissipation, etc.) are analyzed and obtained from more stringent electrical simulations, instead of some assumed ideal values, some average or RMS values, or some extreme values (e.g., worst case corner values) looked up from data sheets or tables. Therefore, more accurate electrical characteristics or even transient electrical characteristics may be obtained for the system or device under test and may thus generate more accurate electrical and/or thermal results (e.g., more accurate Joule heating due to more accurate and realistic electrical characteristics such as currents and resistances).

Manual stitching is no longer required. For example, manual stitching is no longer required between IC dies and the PDN model, between IC package designs and the PDN model, or between the PCB design and the PDN model. Rather, the multi-fabric PDN aware system schematic is automatically generated with the use of the multi-fabric design environment that also extracts and incorporates the PDN model into the multi-fabric system schematic and/or the multi-fabric thermal-aware system schematic.

In addition or in the alternative, with the electrical simulations to determine electrical characteristics and thermal simulations to determine thermal characteristics (e.g., temperatures, temperature distributions, power dissipation, heat fluxes, etc.), rather than using RMS (root mean square), average values, or other less accurate values, these methods and apparatuses described herein may equally and effectively perform transient electrical, thermal, and/or electrical-thermal analyses or simulations to capture instantaneous electrical and thermal characteristics, in addition to steady-state analyses or simulations.

Unlike conventional approaches, capacitors (e.g., intentional decap, parasitic capacitances such as device diffusion parasitic capacitances, power, ground, and/or signal wire capacitances, device gate capacitances, well capacitances, etc.) and inductors are also incorporated in the electrical and/or thermal analyses in some embodiments. In these embodiments, the sizes, designs, and placement of the capacitors and/or the inductors in the IC die design fabric, IC package design fabric, the PCB design fabric, and/or the system or testbench design fabric are accounted for with more stringent electrical and/or thermal analyses and/or simulations, instead of being ignored or merely being looked up from data sheets or tables. The incorporation of capacitors and inductors in the multi-fabric PDN aware system schematic and/or the multi-fabric PDN aware and thermal aware system schematic provide more accurate electrical and thermal characteristics.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level block diagram of a system for implementing a multi-fabric mixed-signal electronic design spanning across multiple design fabrics with electrical and/or thermal analysis awareness in one or more embodiments. In these one or more embodiments, FIG. 1A illustrates an illustrative high level schematic block diagrams for implementing a multi-fabric mixed-signal electronic design spanning across multiple design fabrics with electrical and/or thermal analysis awareness and may comprise one or more computing systems 100, such as one or more general purpose computers described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms or modules 152 including hardware and software modules or combinations of one or more hardware and one or more software modules that are stored at least partially in computer memory may comprises one or more design implementation modules 102 to implement electronic designs at various abstraction levels (e.g., schematic level, layout level, etc.) The set of modules 152 may further include one or more multi-fabric probing modules 104 to probe multi-fabric designs across multiple design fabrics.

The set of modules 152 may further optionally include one or more multi-fabric netlisting modules 106 to netlist multi-fabric designs across multiple design fabrics. In addition or in the alternative, the set of modules 152 may further include one or more multi-fabric analysis modules 108 to perform various static and transient electrical and/or thermal analyses or simulations as well as other analysis or simulation related tasks across multiple design fabrics. In some embodiments, the set of modules 152 may further include one or more track multi-fabric checking or verification modules 110 to check or verify the correctness of multi-fabric designs across multiple design fabrics. In addition or in the alternative, the set of modules 152 may comprise one or more multi-fabric extraction modules 112 to extract various types of data or information from electronic designs in various design fabrics.

A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry.

In these aforementioned embodiments, a symbolic view of a block of circuit elements includes some design data of the block at its boundary (e.g., data or information about the interface to external circuit components) yet does not include detailed design data for circuit components inside the boundary of the block. In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand.

In some embodiments, a symbolic view may be stored or linked together with a schematic view or layout view of a circuit component, block, or cell by using, for example, a profile. The profile may further include or be associated with other information or data including, for example, parasitic information (e.g., capacitances, resistances, etc.), electrical information (e.g., currents, voltages, inductances, etc.), physical information (e.g., sizes or profiles of various shapes, etc.), timing or delay information of the electronic design of interest, other performance-related information, analysis results (e.g., EMI or electromagnetic interference analyses, ISI or inter-symbol interference analyses, crosstalk analyses, etc.), simulation results in various domains and/or fabrics, or any combinations thereof in some of these embodiments. The multi-fabric view correlation module 160 may also correlate the aforementioned information or data with the multi-fabric electronic design, a portion thereof, or the corresponding designs of circuit component in the multi-fabric electronic design. In some embodiments, the multi-fabric view correlation module 160 may further annotate the pertinent portions or circuit component designs with some or all of the aforementioned information or data.

The set of modules 152 may further include one or more multi-fabric signoff modules 170 to perform various signoff and design closure tasks. For example, the one or more multi-fabric signoff modules 170 may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level or better accuracy to ensure an electronic design meets or exceeds power, performance, and/or area goals in some embodiments.

The one or more multi-fabric signoff modules 170 may include one or more physical verification modules to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more multi-fabric signoff modules 170 may include one or more one or more computational lithography modules to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more modules in the set of modules 152. One or more modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
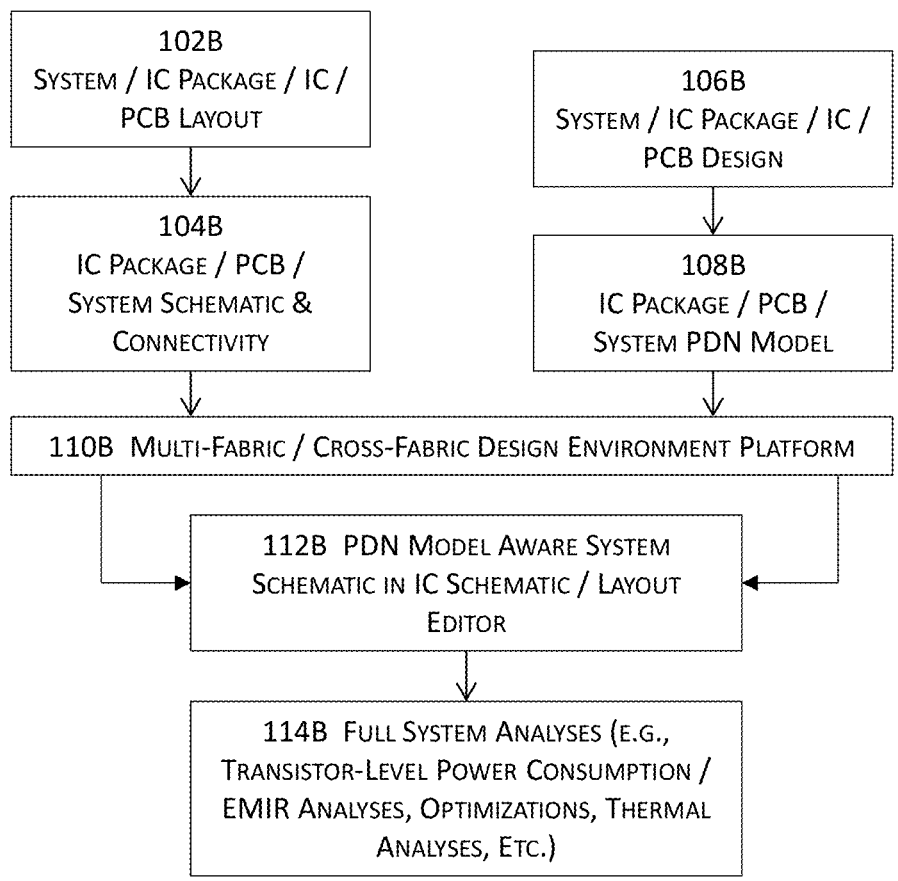
FIG. 1B illustrates another high level block diagram for implementing a multi-fabric mixed-signal electronic design spanning across multiple design fabrics with electrical and/or thermal analysis awareness in some embodiments.

FIG. 1B illustrates another high level block diagram for implementing a multi-fabric mixed-signal electronic design spanning across multiple design fabrics with electrical and/or thermal analysis awareness in some embodiments. In these embodiments, an IC layout, an IC package layout, a PCB layout, and/or a system layout 102B may be processed to determine the corresponding IC schematic, IC package schematic, PCB schematic, or system schematic 104B.

The IC package layout, PCB layout, or system layout may be further processed to extract (e.g., by using the one or more multi-fabric extraction modules 112 in FIG. 1A) information including, for example, connectivity information and/or parasitic information (e.g., transistor level parasitic information) for both the analog and digital blocks in the IC package layout or PCB layout 102B. The connectivity information may be used by the multi-fabric or multi-fabric design environment platform 110B to ensure that design components in different design fabrics are properly interconnected in the final full system schematic 112B.

The extracted information may also be included by automatic annotation or stitching in the IC package schematic or PCB schematic 104B. In these embodiments illustrated in FIG. 1B, different EDA (electronic design automation) tools may be used to process layouts in different design fabrics so that an EDA tool may natively access design data in a layout to determine the corresponding schematic. An EDA tool may natively access design data or any other data if the EDA tool may be used to generate, access, and/or maintain the design data without performing any transformation, mapping, export, or abstraction (collectively transform or transformation) on the design data in some embodiments.

In some of these embodiments, only design data that are native to an EDA tool are visible to and accessible by the EDA tool. In these embodiments, design data are non-native to an EDA tool if the EDA tool cannot access the design data without performing some transformation, exportation, or mapping on the design data. In some of these embodiments, design data that are non-native to an EDA tool are invisible to and hence inaccessible by the EDA tool.

For example, a PCB layout tool may be used to process the PCB layout to generate the PCB schematic while the IC package designs and the IC designs therein are respectively processed by the IC package layout tool and the IC layout tool to generate the respective IC package schematics and IC schematics. In some embodiments, a three-dimensional layout for the entire system, the entire PCB design, or the entire IC package designs may be identified and processed at 106B to generate the corresponding PDN models for the respective design fabrics. The three-dimensional solid model layout may include, for example, three-dimensional die stack, I/O (input/output) pad-rings or arrays, connectivity information or assignment, etc. in some of embodiments.

In addition, an IC layout, an IC package layout, a PCB layout, and/or a system layout 106B may be processed to determine the corresponding power delivery network (PDN) models 108B. In some embodiments, a layout in 106B includes sufficient information to generate the SPICE or SPICE-compatible models of the full-chip PDN, full-IC package PDN, the full-PCB PDN, or the full-system PDN. The layout in 106B may also include information for generating SPICE models for I/O signals coupled to power and ground, connectivity information between IC die models, IC package models, IBIS models, PCB model, and the system model.

The multi-fabric or multi-fabric design environment platform 110B receives both the generated system, PCB, IC package, and IC schematics 104B and the PDN models 108B and generate a PDN model aware system schematic 112B by integrating the PDN model(s) with the schematics across multiple design fabrics into the system schematic with the connectivity information that may also be extracted from various layouts. By integrating the PDN model(s) with the schematics across multiple design fabrics, the system schematic is thus made aware of the PDN model(s). In some embodiments, the system schematic may be generated in a format that is natively accessible by an IC design suite (e.g., IC schematic suite including the IC schematic editor, schematic simulators, etc.) to leverage the extensive development in EDA tools for the IC design fabric.

One or more full system electrical and/or thermal analyses or full system electrical-thermal co-simulations 114B may be performed with the system schematic 112B in light of the power delivery network of the entire system, not merely a portion thereof. In these embodiments, the PDN is loaded by the entire system. Therefore, impacts on power delivery to individual circuit components, blocks, or cells as well as additional voltage drops caused by, for example, IC packages and/or PCB before delivering power to individual circuit components may be more accurately captured by the full system analyses 114B. For example, additional voltage drops caused by traces in the power delivery network may cause insufficient power supplied to an IC. This insufficient power supplied to an IC as well as the additional voltage drops may skew the IR-drop analysis results in conventional approaches yet can be more accurately modeled and captured with the PDN model aware system schematic 112B.

A multi-fabric, multi-fabric design environment platform may include the test bench fabric, the printed circuit board and packaging fabric, and the die fabric. In some of these embodiments, the multi-fabric design environment may include an IC packaging fabric and a printed circuit board fabric. The multi-fabric, multi-fabric design environment platform may include one or more test bench design databases in the test bench fabric, one or more IC design databases in the die fabric, one or more IC packaging design databases and one or more printed circuit board design databases in the fabric.

In some embodiments where the multi-fabric design environment includes a printed circuit board fabric and a separate IC packaging fabric, the multi-fabric design environment may include one or more IC packaging design data databases in the IC packaging fabric and one or more PCB design data databases in the PCB fabric. The multi-fabric design environment may further include one or more IC design tools such as an IC schematic suite or an IC layout suite for manipulating the native schematic or physical design data of integrated circuit designs in the die fabric. The multi-fabric, multi-fabric design environment platform may also include one or more PCB design tools for manipulating the native schematic or physical design data of PCB designs in the PCB/IC packaging fabric or in the dedicated PCB fabric. The multi-fabric, multi-fabric design environment platform may also include one or more IC packaging design tools for manipulating the native schematic or physical design data of IC packaging designs in the PCB/IC packaging fabric or in the dedicated IC packaging fabric.

Figure 1C:
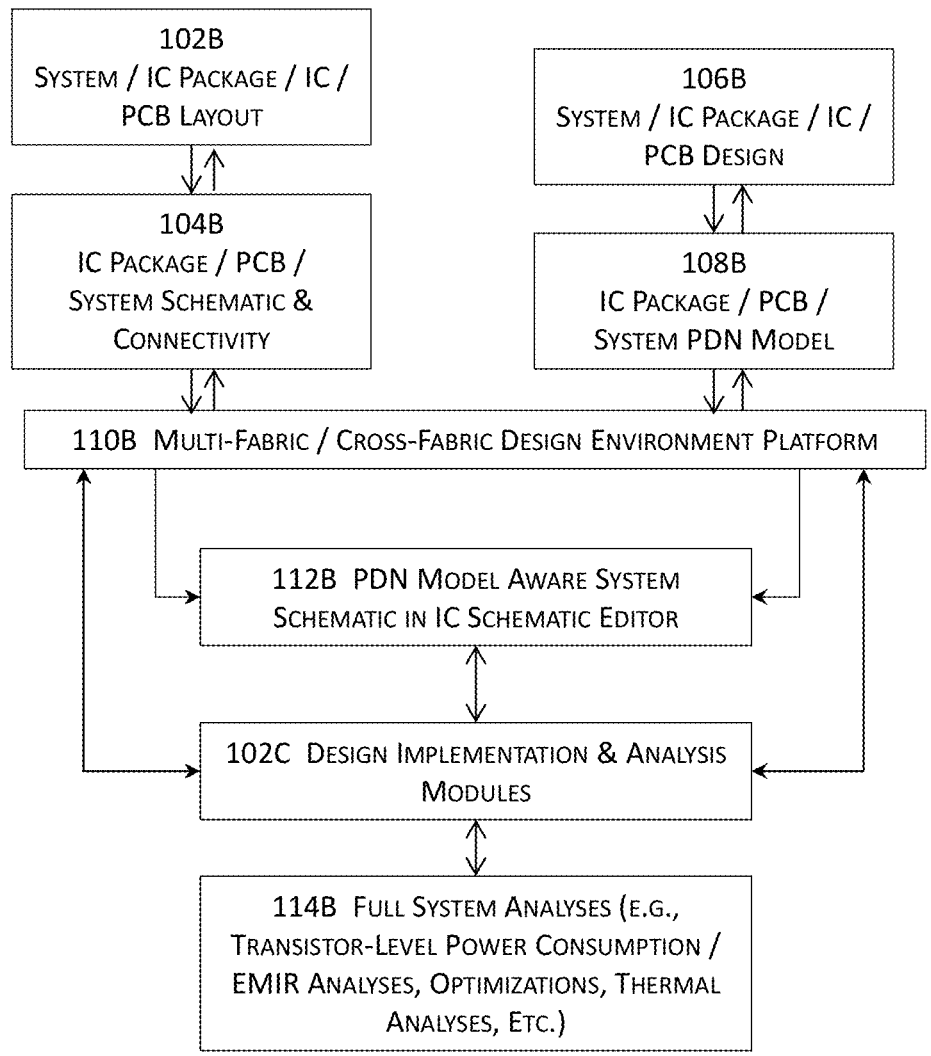
FIG. 1C illustrates another high level block diagram for implementing a multi-fabric mixed-signal electronic design spanning across multiple design fabrics with electrical and/or thermal analysis awareness in some embodiments.

FIG. 1C illustrates another high level block diagram for implementing a multi-fabric mixed-signal electronic design spanning across multiple design fabrics with electrical and/or thermal analysis awareness in some embodiments. More specifically, FIG. 1C illustrates a block diagram similar to that illustrated in FIG. 1B with the addition of one or more design implementation and analysis modules 102C.

The one or more design implementation and analysis modules 102C operates within the multi-fabric, multi-fabric design environment platform 110B are operatively coupled to the system schematic 112B and the one or more full system analyses 114B such that information about any errors or deviations from the intended design captured in the one or more full system analyses 114B may be relayed back to the design implementation and analysis modules 102C that may use the respective EDA tools to natively modify the corresponding designs to correct the errors or to bring the corresponding designs to the intended designs.

The design implementation and analysis modules 102C may further pass the corrections or modifications that may impact the system schematic 112B to the system schematic 112B or to the respective EDA tools to natively make corresponding changes in the layouts 102B and/or 106B. In addition or in the alternative, the design implementation and analysis modules 102C may also perform various tasks on the system schematic 112B prior to performing the one or more full system analyses 114B to identify any errors or deviations in the system schematic 112B and pass the information about the identified errors or deviations back to the respective EDA tools via the multi-fabric, multi-fabric design environment platform 110B to invoke corresponding EDA tools to natively make corrections or modifications to the corresponding electronic designs.

This process flow between the identification and processing of layouts 102B and 106B and the performance of one or more full system analyses 114B may be iteratively performed until a stopping criterion is reached. For example, this process flow may be iteratively performed until the results of the one or more full system analyses are within a predetermined set of values, until a predetermined number of iterations has been reached, or until any other suitable criteria for stopping the iteration.

Figure 2A:
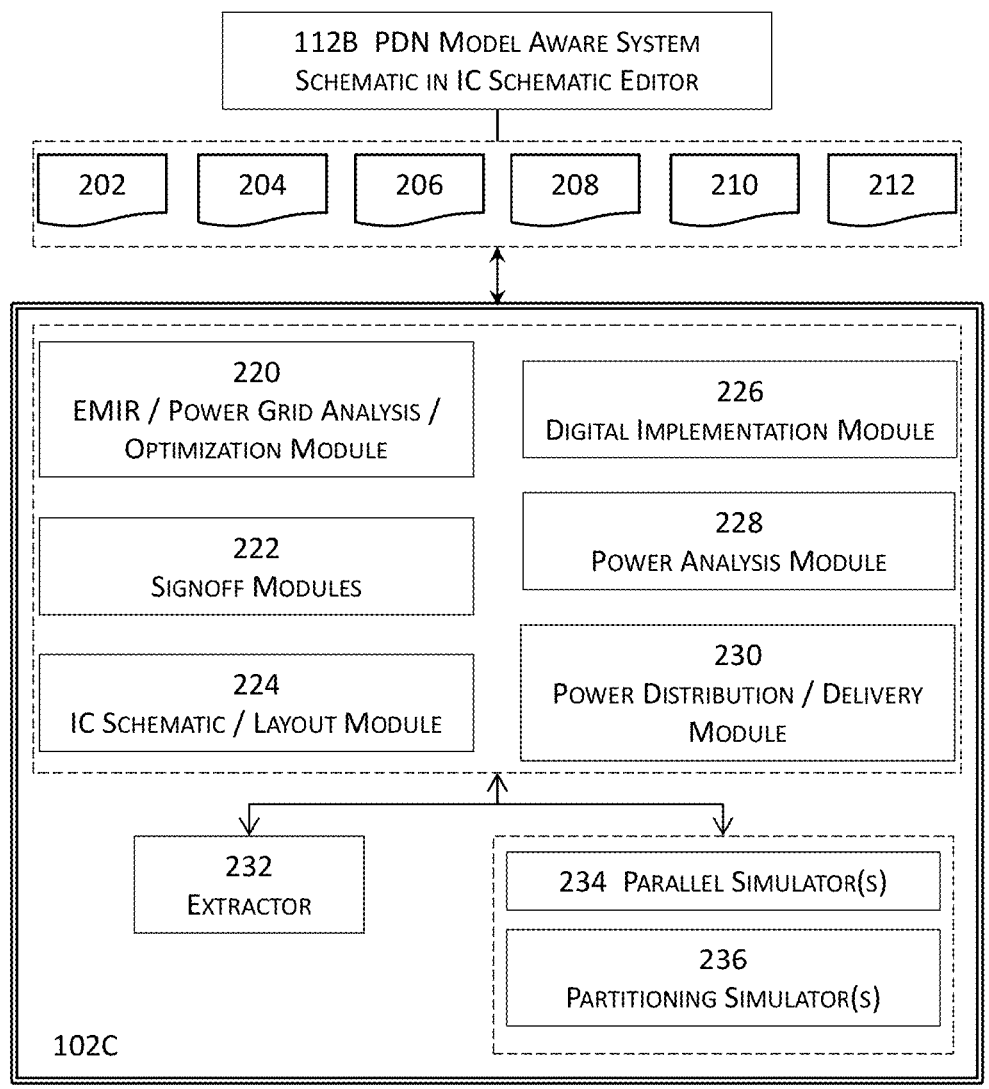
FIG. 2A illustrates a more detailed block diagram for the design implementation and analysis modules illustrated in FIG. 1C in some embodiments.

FIG. 2A illustrates a more detailed block diagram for the design implementation and analysis modules illustrated in FIG. 1C in some embodiments. More specifically, FIG. 2A illustrates some examples of components that may be captured in a system schematic 112B. In these embodiments illustrated in FIG. 2A, a PDN model aware system schematic may include, for example but not limited to, schematic representations of RF (radio frequency) devices 202, schematic representations of one or more analog portions of the entire system 204, schematic representations of one or more mixed-signal portions of the entire system 206, schematic representations of one or more digital or custom digital portions of the entire system 208, schematic representations of one or more cells or blocks in the entire system 210, the PDN model(s) 212 of the system or a portion thereof, or any combinations thereof.

FIG. 2A further illustrates some examples of the modules in the design implementation and analysis modules 102C. The design implementation and analysis modules 102C may include a EMIR/power grid analysis or optimization module 220 performing the EMIR and/or power grid analysis and/or optimization, one or more signoff modules 222 (e.g., the one or more multi-fabric signoff modules 170 in FIG. 1A), an IC schematic and/or layout suite 224, a digital implementation module 226 that performs various tasks and functions to implement digital circuits, a power analysis modules 228 performing various tasks or functions for power and/or signal integrity analyses, a power distribution or delivery modules 230 that performs various tasks and functions to ensure the provisioning of clean power and reference voltages to active devices in a system and to generate a PDN model to represent the actual power delivery network topology, or any combinations thereof.

In addition to common circuit components for delivering power, a PDN model may include, for example, voltage regulator modules (VRMs), decoupling capacitors, parasitics from power plane and ground plane spreading, ball grid array vias, and/or plane capacitance in some embodiments. The aforementioned modules (reference numerals 220, 222, 224, 226, 228, and/or 230) in the design implementation and analysis modules 102C may also be operatively coupled to one or more extractors 232, one or more parallel simulators 234, and/or one or more partitioning simulators 236 that may also be a part of the design implementation and analysis modules 102C.

Figure 2B:
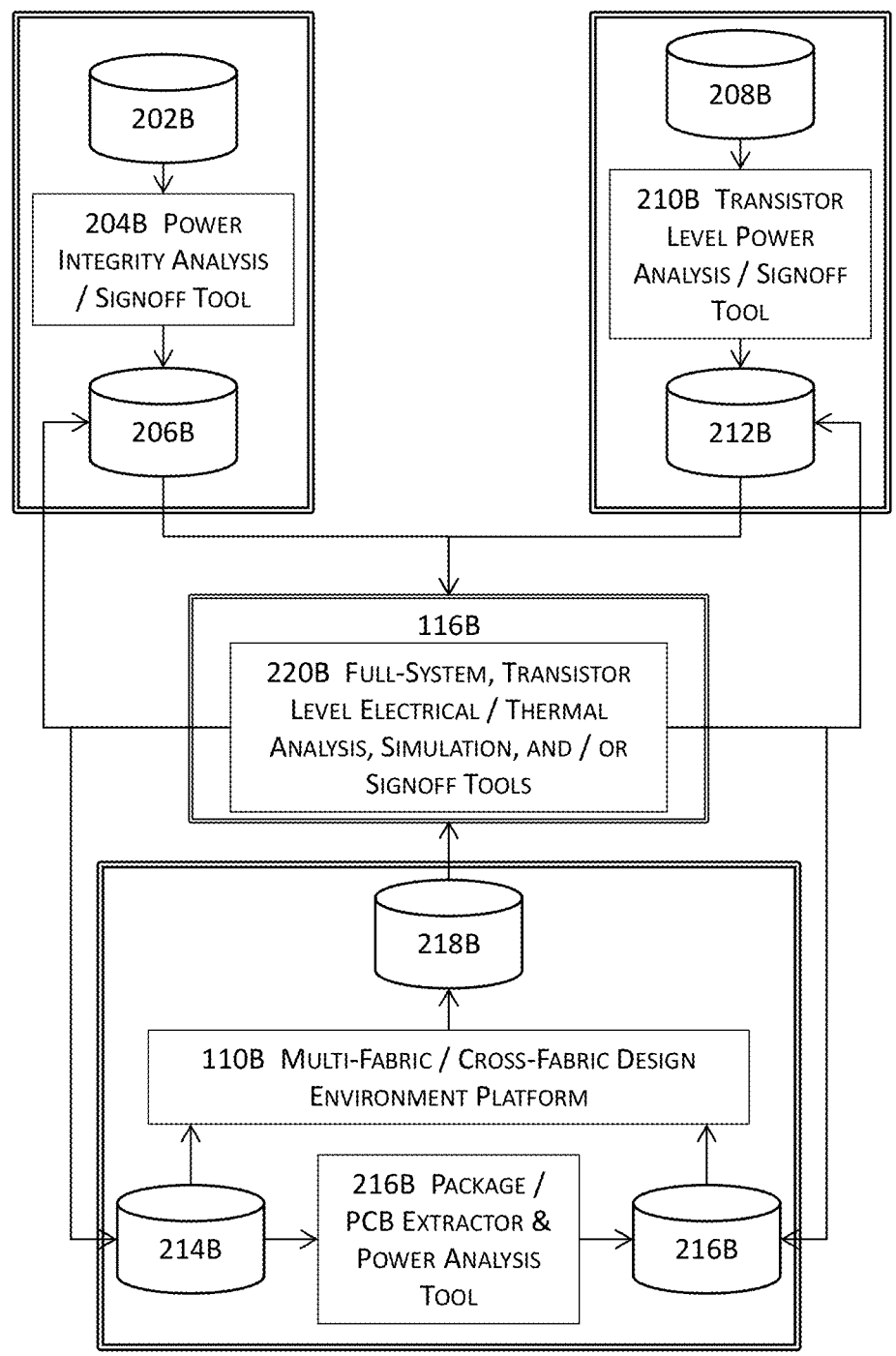
FIG. 2B illustrates a high level block diagram for implementing a multi-fabric mixed-signal electronic design spanning across multiple design fabrics with electrical and/or thermal analysis awareness in some embodiments.

FIG. 2B illustrates a high level block diagram for implementing a multi-fabric mixed-signal electronic design spanning across multiple design fabrics with electrical and/or thermal analysis awareness in some embodiments. More specifically, FIG. 2B illustrates an example of analyzing an analog or mixed-signal portion of a system within the context of the entire system including a digital portion in addition to the analog or mixed-signal portion.

In these embodiments, an analysis or signoff tool (e.g., a power integrity analysis and/or signoff tool) 204B receives and processes a digital layout portion 202B of digital circuit components or blocks and generates one or more first chip power models 206B for the digital circuit components or blocks in the digital portion. In some embodiments, the schematic view and/or connectivity information associated with the one or more first chip power models may also be extracted and stored at 206B. The connectivity information may be used in the subsequent creation of PDN aware full-system schematic to ensure that these one or more chip power models are properly interconnected.

The power integrity analysis and/or signoff tool 204B may perform various tasks such as full-chip, cell level power integrity analysis, signoff, design closure, or optimization, power grid analyses or optimization, decoupling capacitance analyses or optimization, power-gating analyses or optimization, etc. while maintaining SPICE-level accuracy for designers to debug, verify, and/or fix IC chip power consumption, IR drop, and/or electro-migration (EM) constraints and violations in some embodiments.

A chip power model includes a compact electrical representation (e.g., a SPICE, SPICE-like, or SPICE compatible model) of the full-chip or the full-chip PDN of a die in various operating modes so that an IC package or PCB designer may optimize IC package designs or PCB designs with the chip power models of the chips in the IC packages or PCB by, for example, eliminating excessive package layers, decoupling capacitors, power pads, etc. while maintaining power integrity to minimize late stage design issues in some embodiments.

A chip power model may be generated by modeling the entire die power delivery network including, for example, device level information (e.g., leakage information, switching information, etc.) and parasitic information by using the results of full-chip time domain simulations and/or full-chip frequency domain simulations. A chip power model may also model operations of a chip in one or more modes that cause additional stresses for the power delivery network in some embodiments. For example, a chip power model may account for resonant frequencies in the power delivery network.

A chip power model may also be a compact representation of a discrete component in the PCB design or the system design in some embodiments. Therefore, a chip power model may refer to a compact electrical representation of a full-IC chip, a full-IC package, a discrete circuit component in the PCB or system design, or a cell or block at any abstraction level (e.g., IC die design level, IC package design level, PCB design level, or system design level, etc.) in the electronic design of the system in these embodiments.

An analysis or signoff tool (e.g., a transistor level power analysis and/or signoff tool) 210B receives and processes an analog or mixed-signal layout portion 208B of analog or mixed-signal circuit components or blocks and generates a schematic view for an analog die of interest as well as one or more second chip power models 212B for the remainder of the analog or mixed-signal circuit components or blocks. In some embodiments, connectivity information associated with the schematic view and/or the one or more second chip power models 212B may also be extracted and stored at 212B.

Both the one or more first chip power models 206B, the schematic view of the analog die of interest, one or more second chip power models 212B, and the associated connectivity information may be forwarded to one or more analysis tools 220B to perform one or more full system, transistor level electrical and/or thermal analyses or simulations to determine, for example, various electrical and/or thermal characteristics. The electrical and thermal analyses or simulations or the electrical-thermal co-simulations may be iteratively performed until satisfactory analysis results are obtained.

In addition, various layouts 214B including the system layout, the layouts for IC packages in the system, and/or the PCB layout for the PCB in the system may be identified in the multi-fabric, multi-fabric design environment platform 110B. Native EDA tools (e.g., IC package layout tool for IC package layouts, PCB layout tools for the PCB layout, etc.) 216B may receive and natively process their corresponding layouts 214B to generate the corresponding power delivery network models 216B for the IC packages, the PCB, and/or the system.

These PDN models are then forwarded to the multi-fabric, multi-fabric design environment platform 110B. The multi-fabric, multi-fabric design environment platform 110B may then integrate or assemble these one or more first chip power models 206B for the digital portion, one or more second chip power models 212B for the analog portion, the schematic view of analog or mixed-signal die of interest 212B, and PDN models 216B into a full-system schematic 218B that is made aware of the PDN models. The analysis, simulation, and/or signoff tools may perform various thermal, electrical, or thermal-electrical analyses, simulations, and/or signoff with the PDN aware full-system schematic 218B.

The multi-fabric, multi-fabric design environment platform 110B may designate a schematic suite in one of multiple design fabrics to integrate or assemble the full-system schematic. Due to the extensive development of various verification, analysis, simulation, and signoff tools for the IC designs, an IC schematic suite may be designated as the tool for integrating and assembling these chip power models, PDN models, schematic views, and connectivity information.

Because EDA tools for IC design may only natively access IC die designs in the IC design fabric, any data that are originated from other design fabrics and are thus not natively accessible by the IC design EDA tools may be represented as symbolic representations, unless these data are generated in one or more common formats that are also accessible by the IC design EDA tools in some embodiments. In some of these embodiments including symbolic representations of some design data, the designated EDA tool may generate the full-system schematic by integrating or assembling native models and non-native symbolic representations by using the extracted connectivity information associated with the native models and the non-native symbolic representations.

It shall be noted that in these embodiments illustrated in FIG. 2B, the digital portions and the analog or mixed-signal portions are processed separately. Nonetheless, separate processing of digital portions and analog or mixed-signal portions may be due to the respective availability of the digital portions and the analog or mixed-signal portions and is not necessarily required for all electronic designs. In some embodiments, the entire electronic design of an entire system, an entire PCB, or an entire IC package design may be processed as a whole or in multiple portions subject to other partitioning schemes other than the digital-analog partitioning scheme that subdivides an entire design into digital portions and analog or mixed-signal portions as illustrated in FIG. 2B.

Figure 3:
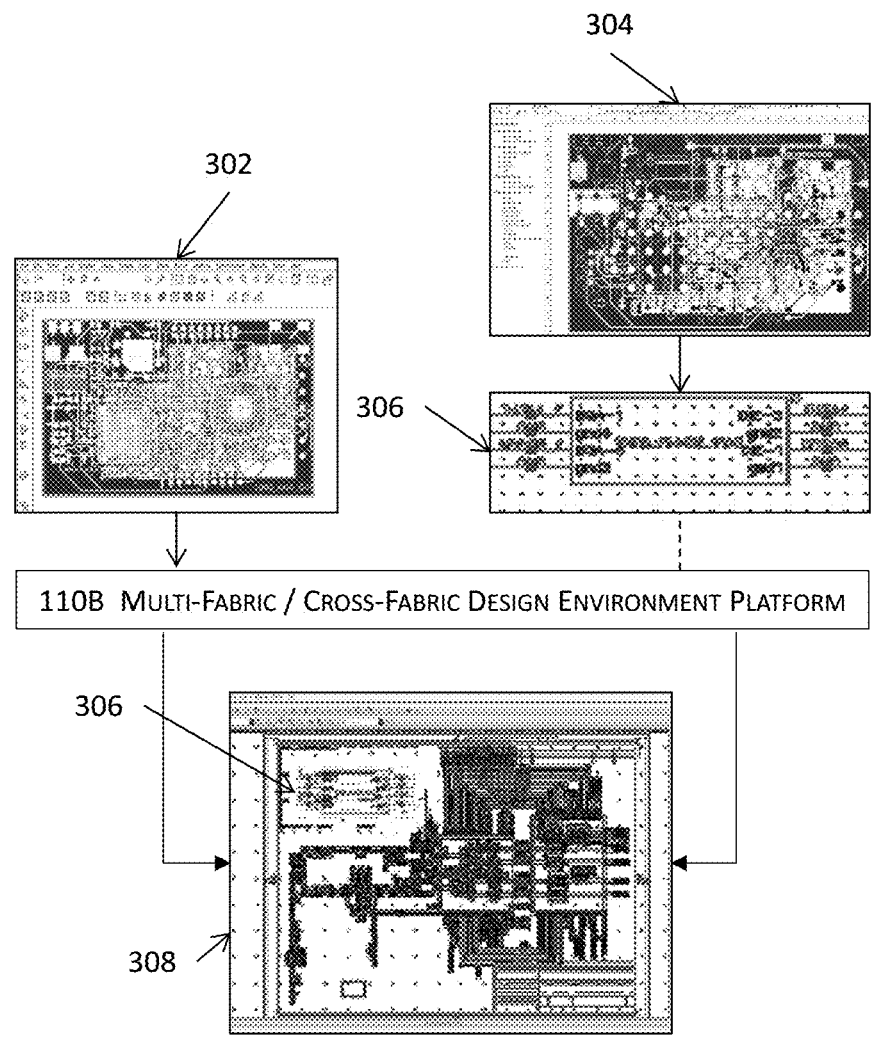
FIG. 3 illustrates a working example of generating a PDN-aware, multi-fabric system schematic in some embodiments.

FIG. 3 illustrates a working example of generating a PDN-aware, multi-fabric system schematic in some embodiments. More specifically, this working example illustrates the generation of a PDN aware full-system schematic that may be used to analyze an analog or mixed-signal die of interest within the context of the entire system including a purely digital portion including multiple digital dies and an analog or mixed-signal portion including multiple analog or mixed-signal dies but excluding the analog or mixed-signal die of interest.

In this example, the multi-fabric, multi-fabric design environment platform 110B receives a package or system schematic 302 that may be extracted from a system or package layout. The system or package layout may include, for example, three-dimensional die stack, I/O (input/output) pad-rings or arrays, connectivity information, etc. in some of these embodiments. A layout 304 (e.g., a layout in GDSII or LEF/DEF or library exchange format/design exchange format) may be identified. A fully distributed PDN model that includes one or more SPICE or SPICE-compatible models with I/O nets 306 may be generated from the layout 304 and forwarded to the multi-fabric, multi-fabric design environment platform 110B.

The PDN model also accounts for electromagnetic coupling effects between signals, power, and ground. The multi-fabric, multi-fabric design environment platform 110B may then integrate or assemble package or system schematic 302 and the PDN model 306 into a full-system schematic that is made aware of the PDN model. The PDN aware full-system schematic may then be used in various electrical or thermal analyses or simulations to provide full-system or chip-package-board-system static or transient analyses.

Figure 4A:
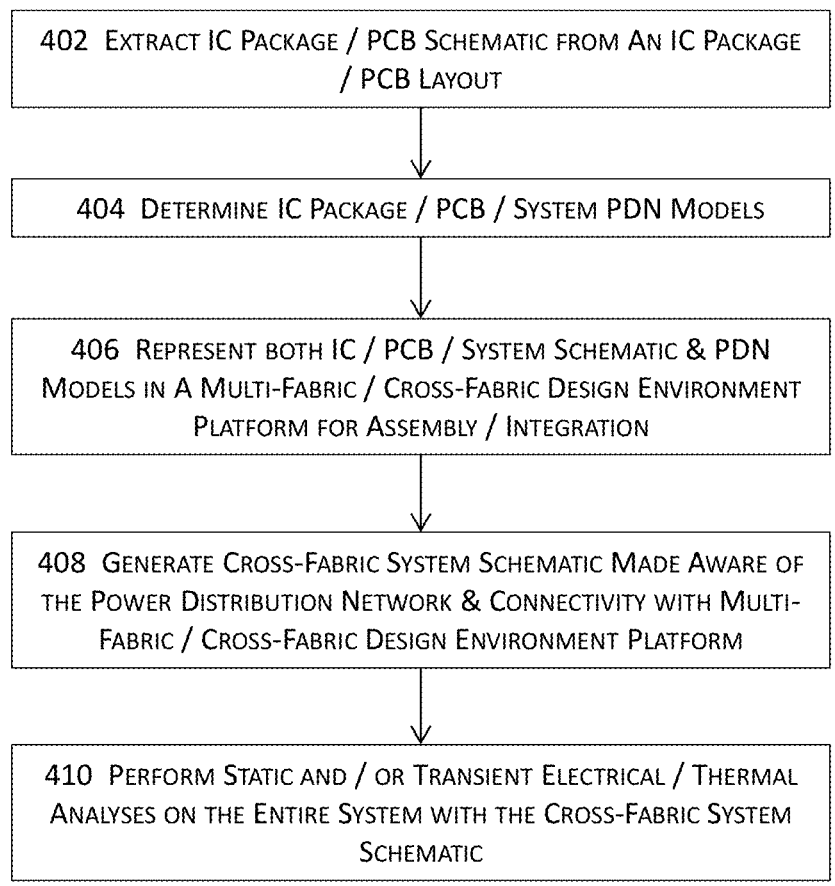
FIG. 4A illustrates a high level block diagram for implementing a multi-fabric mixed-signal electronic design spanning across multiple design fabrics with electrical and/or thermal analysis awareness in some embodiments.

FIG. 4A illustrates a high level block diagram for implementing a multi-fabric mixed-signal electronic design spanning across multiple design fabrics with electrical and/or thermal analysis awareness in some embodiments. In these embodiments, a package or PCB schematic may be extracted at 402 from an IC package layout or a PCB layout. A layout from which a schematic may be extracted may include, for example, three-dimensional die stack, I/O (input/output) pad-rings or arrays, connectivity information, etc. in some embodiments.

In some of these embodiments, a layout from which a schematic may be extracted may include a three-dimensional solid model layout in which circuit components are modeled as three-dimensional objects. In some embodiments, a multi-fabric, multi-fabric design environment may invoke native EDA tools that natively process design data in their respective design fabrics. For example, an IC schematic may be extracted by an IC design tool; an IC package schematic may be extracted by an IC package design tool; a PCB schematic may be extracted by a PCB design tool; and a system schematic may be extracted by a system design tool.

Native design data may be faithfully reproduced in the native EDA tool, while non-native design data may be represented as one or more symbolic representations in the EDA tool. More details about natively processing design data with a native EDA tool and representing non-native design data as symbolic representations are provided in the U.S. patent applications in the CROSS-REFERENCE TO RELATED APPLICATIONS sections, and that these U.S. patent applications are hereby expressly incorporated by reference for all purposes.

In addition, one or more chip power models for a circuit component, a block of circuit components, a cell, or a chip may be determined at 402. As presented earlier, a chip power model includes a compact electrical representation (e.g., a SPICE, SPICE-like, or SPICE compatible model) of the full-chip or the full-chip PDN of a die in various operating modes. A chip power model may be generated by modeling the entire die power delivery network including, for example, device level information (e.g., leakage information, switching information, etc.) and parasitic information by using the results of full-chip time domain simulations and/or full-chip frequency domain simulations. A chip power model may also model operations of a chip in one or more modes that cause additional stresses for the power delivery network in some embodiments.

The PDN models for IC packages, the PCB, and/or the system may be determined at 404 from a layout in some embodiments. In some of these embodiments, a layout from which a schematic may be extracted may include a three-dimensional solid model layout in which circuit components are modeled as three-dimensional objects. The layout from which one or more PDN models may be extracted may provide three-dimensionality information such that cross-coupling effects in the three-dimensional space may be correctly modeled and analyzed. In some embodiments, a layout in 106B includes sufficient information to generate the SPICE or SPICE-compatible models of the full-chip PDN, full-IC package PDN, the full-PCB PDN, or the full-system PDN.

The layout in 106B may also include information for generating SPICE models for I/O signals coupled to power and ground, connectivity information between IC die models, IC package models, IBIS models, PCB model, and the system model. In these embodiments, the PDN model generated from the layout at 404 may include SPICE or SPICE-compatible models of the full-chip PDN, full-IC package PDN, the full-PCB PDN, or the full-system PDN. The PDN model may further include SPICE or SPICE-compatible models for I/O signals coupled to power and ground, connectivity information between IC die models, IC package models, IBIS models, PCB model, and the system model.

Both the IC package and/or PCB schematic extracted at 402 and the PDN model determined at 404 may be represented in the multi-fabric, multi-fabric design environment platform so that these design data from different design fabrics are ready for generation of a multi-fabric system schematic. The multi-fabric, PDN aware full-system schematic may be generated at 408B with the multi-fabric, multi-fabric design environment platform. The multi-fabric, multi-fabric design environment platform (e.g., 110B in FIG. 1B) may designate a schematic suite in one of multiple design fabrics to integrate or assemble the multi-fabric, PDN aware full-system schematic.

For example, an IC schematic suite may be designated as the tool for integrating and assembling these chip power models, PDN models, schematic views, and connectivity information. Because EDA tools for IC design may only natively access IC die designs in the IC design fabric, any data that are originated from other design fabrics and are thus not natively accessible by the IC design EDA tools may be represented as symbolic representations, unless these data are generated in one or more common formats that are also accessible by the IC design EDA tools in some embodiments.

In some of these embodiments including symbolic representations of some design data, the designated EDA tool may generate the multi-fabric, PDN aware full-system schematic by integrating or assembling native models and non-native symbolic representations by using the extracted connectivity information associated with the native models and the non-native symbolic representations.

Various static or transient electrical, thermal, or both electrical and thermal analyses may be performed with the multi-fabric, PDN aware full-system schematic. Because of the SPICE or SPICE-compatible models in the chip power models and the PDN model used in the assembly or integration of the multi-fabric, PDN aware full-system schematic, these various static or transient analyses provide at least SPICE level accuracy, instead of less accuracy from corner or worst case scenarios by looking up from design data sheets or tables.

Figure 4B:
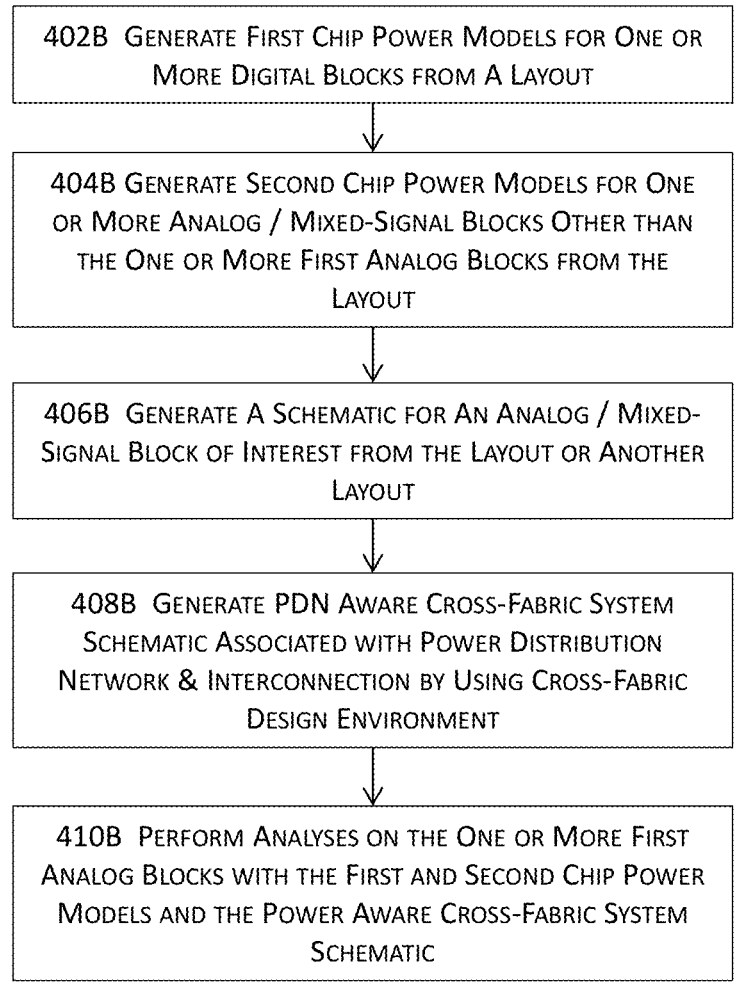
FIG. 4B illustrates another high level block diagram for implementing a multi-fabric mixed-signal electronic design spanning across multiple design fabrics with electrical and/or thermal analysis awareness in some embodiments.

FIG. 4B illustrates another high level block diagram for implementing a multi-fabric mixed-signal electronic design spanning across multiple design fabrics with electrical and/or thermal analysis awareness in some embodiments. More specifically, FIG. 4B illustrates a block diagram for implementing a multi-fabric mixed-signal electronic design spanning across multiple design fabrics where an analog or mixed-signal die of interest is analyzed within the context of the surrounding digital portion and the remaining analog or mixed-signal portion.

In these embodiments, one or more first chip power models for one or more digital blocks may be generated at 402B from one or more layouts including the one or more digital blocks. A layout from which a schematic may be extracted may include, for example, three-dimensional die stack, I/O (input/output) pad-rings or arrays, connectivity information, etc. in some embodiments. In some of these embodiments, these one or more layouts from which a schematic may be extracted may include a three-dimensional solid model layout in which circuit components are modeled as three-dimensional objects.

Connectivity information may also be extracted from these one or more layouts to ensure proper assembly of the one or more first chip power models with each other or with the remainder of the system. These one or more layouts may also include design data for IC packages, PCB, or even the entire system in some embodiments. In these embodiments, the schematic and/or the connectivity information for the package, the PCB, or the system may also be extracted from the layout. One or more second chip power models may also be generated at 404B for one or more analog or mixed-signal blocks from these one or more layouts.

As in the one or more digital blocks, connectivity information may also be extracted from the layout to ensure proper assembly of the one or more second chip power models with each other or with the remainder of the system. At 402B and 404B, these one or more layouts may belong to multiple design fabrics, and the generation or extraction of chip power models and schematics may invoke multiple EDA tools, each of which may natively process design data in its corresponding design fabric. A schematic for the analog or mixed-signal block of interest may be extracted from the one or more layouts.

Connectivity information such as the connectivity information for interconnecting the analog or mixed-signal block of interest to one or more packages or to its surrounding circuit components may also be extracted for the analog or mixed-signal block of interest. A multi-fabric, multi-fabric design fabric platform (e.g., 110B) may be used to generate a multi-fabric, PDN aware full-system schematic at 408 by integrating or assembling the one or more first chip power models determined at 402B, the one or more second chip power models determined at 404B, and the schematic for the analog or mixed-signal block of interest extracted at 406B using the connectivity information to ensure proper interconnections among these chip power models and the schematic.

With the multi-fabric, PDN aware full-system schematic, one or more electrical and/or thermal analyses may be performed at 410B to analyze the analog or mixed-signal block of interest within the context of the remaining system. In some embodiments where the analog or mixed-signal block of interest is analyzed only in view of a smaller portion of the entire system, the process described herein may also process the smaller portion of the entire system to generate the needed chip power models and use the corresponding portion of the PDN model for the analyses of the analog or mixed-signal block of interest.

Figure 5A:
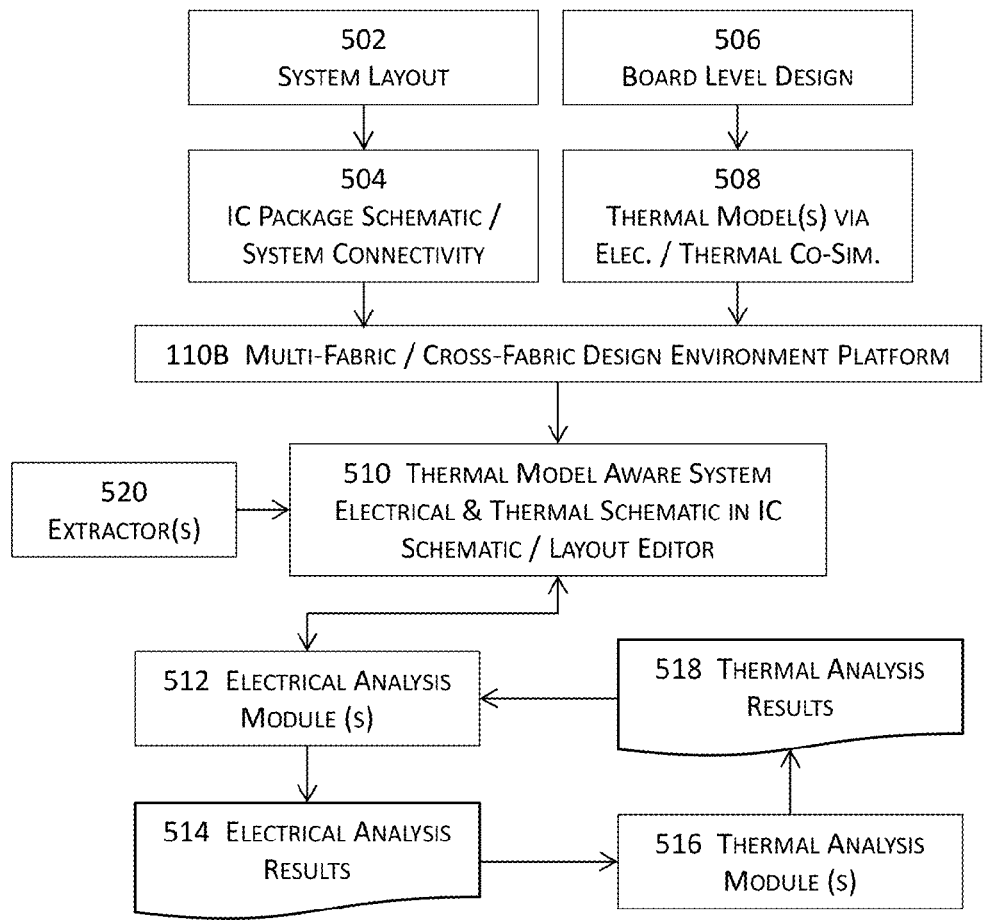
FIG. 5A illustrates a block diagram for implementing a multi-fabric mixed-signal electronic design spanning across multiple design fabrics with electrical and/or thermal analysis awareness in some embodiments.

FIG. 5A illustrates a block diagram for implementing a multi-fabric mixed-signal electronic design spanning across multiple design fabrics with electrical and/or thermal analysis awareness in some embodiments. In these embodiments, electronic design schematics (e.g., IC schematic, IC package schematic, PCB schematic, system schematic, etc.) may be determined (e.g., by extraction) from one or more layouts 502. Connectivity information for interconnecting ICs, IC packages, one or more PCBs, and discrete components in the system may also be extracted or determined at 504.

In addition, thermal models (e.g., thermal RC models, or thermal SPICE or SPICE-like models, etc.) 508 may be determined from electronic designs (e.g., schematics of an IC, an IC package, a PCB, a system, etc.) 506. The schematics, connectivity information, and optionally thermal models may be determined in a multi-fabric, multi-fabric design environment platform (e.g., 110B in FIG. 1B) that functions in conjunction with one or more extractors 520 that respectively and natively extract data or information from their corresponding native designs.

For example, an IC design fabric extractor may be used to extract the IC schematic and the connectivity information in the IC design fabric; an IC package design fabric extractor may be used to extract the IC package schematic and the connectivity information in the IC package design fabric; and a PCB design fabric extractor may be used to extract the PCB schematic and the connectivity information in the PCB design fabric. A PDN aware, multi-fabric system schematic may be determined at 510. In some embodiments where the thermal models are also determined at 508 and assembled into the system schematic, the PDN aware, multi-fabric system schematic may also be made thermally-aware.

One or more electrical analyses (e.g., power integrity analysis, electro-migration analysis, IR-drop analysis, etc.) may be performed with one or more electrical analysis modules 512 on the multi-fabric, PDN aware system schematic to generate electrical analysis results 514. In some embodiments, the electrical analysis results 514 may include, for example, electrical characteristics (e.g., currents, voltages, voltage drops, electro-migration, signal integrity, power consumption, power integrity, etc.) The one or more electrical analyses may include simulations such as SPICE or SPICE-like simulations to provide SPICE-level accuracy in the electrical analysis results 514.

At least a part of the electrical analysis results 514 may be forwarded to one or more thermal analysis modules 516, which also operate on the PDN aware, multi-fabric system schematic such that these one or more thermal analysis modules 516 may further fine tune various elements of the thermally-aware, PDN aware, multi-fabric system schematic to more accurately capture the impacts of the more accurately captured electrical characteristics of the system. For example, with the more accurately captured electric currents, voltages, and parasitics, the one or more electrical analysis modules 512 may more accurately capture the power consumption data that may be used to fine tune the thermally-aware, PDN aware, multi-fabric system schematic to update the heat generation in order to more accurately compute, for example, heat dissipation.

The one or more thermal analysis modules 516 may perform one or more thermal analyses on the thermally-aware, PDN aware, multi-fabric system schematic to generate thermal analysis results 518. In some embodiments, numerical techniques such as finite element techniques or finite difference techniques may be used to perform these one or more thermal analyses. In some other embodiments, these one or more thermal analyses may also include SPICE or SPICE-like simulations with the SPICE or SPICE-like thermal models in the PDN aware full-system schematic to provide equivalent accuracy as the numerical techniques, without resorting to the aforementioned numerical techniques or the disproportional size differences in meshing nano-scale design elements (e.g., circuit components in an IC) and macro-scale design elements (e.g., traces or discrete components in the system design or in the PCB design).

At least a part of the thermal analysis results 518 may be forwarded to one or more electrical analysis modules 512, which also operate on the thermally-aware, PDN aware, multi-fabric system schematic such that these one or more electrical analysis modules 512 may further fine tune various elements of the thermally-aware, PDN aware, multi-fabric system schematic to more accurately capture the impacts of the more accurately captured thermal behavior of the system. For example, with the more accurately captured static or transient temperatures, the one or more electrical analysis modules 512 may update the electrical characteristics (e.g., resistance, etc.) that exhibit temperature dependency.

The one or more electrical analysis modules 512 may then re-run the one or more electrical analyses with the updated electrical characteristics to even more accurately capture the thermal effects and impacts on the electrical behavior of the system. These electrical and thermal analyses may be iteratively performed until a stopping criterion is reached. For example, this process flow may be iteratively performed until the results of the one or more full system analyses are within a predetermined set of values, until a predetermined number of iterations has been reached, or until any other suitable criteria for stopping the iteration.

Figure 5B:
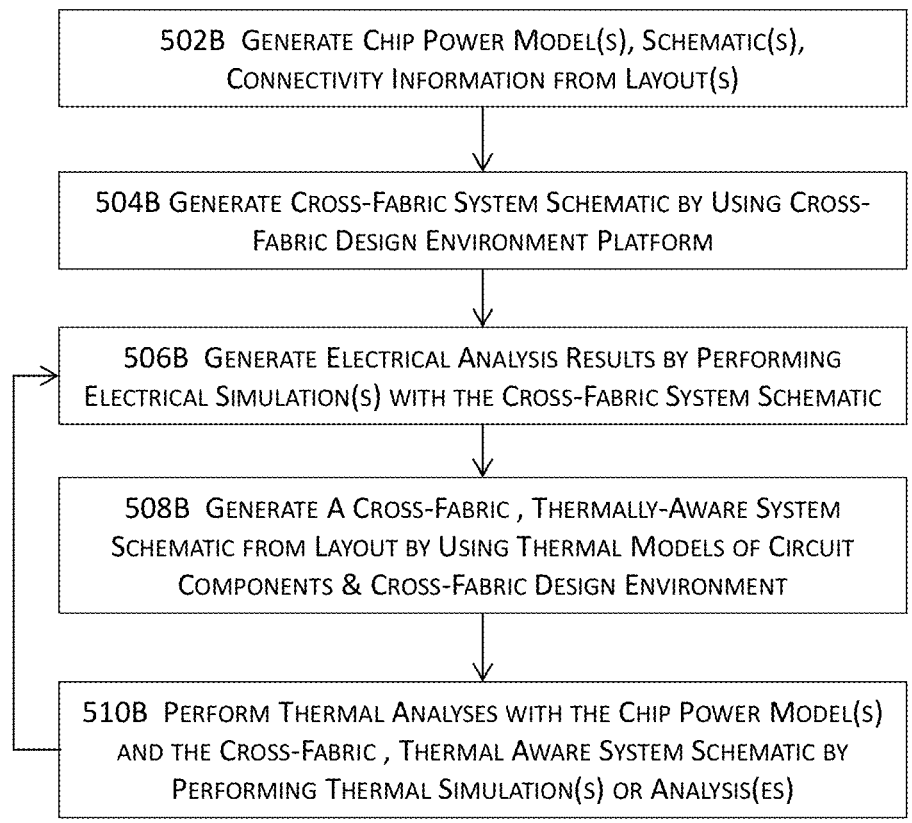
FIG. 5B illustrates a block diagram for implementing a multi-fabric mixed-signal electronic design spanning across multiple design fabrics with electrical and thermal analysis awareness in some embodiments.

FIG. 5B illustrates a block diagram for implementing a multi-fabric mixed-signal electronic design spanning across multiple design fabrics with electrical and thermal analysis awareness in some embodiments. In these embodiments, one or more chip power models, schematics, and/or connectivity information may be generated at 502B. A PDN-aware, multi-fabric system schematic may be generated at 504B by using at least the multi-fabric, multi-fabric design environment (e.g., 110B in FIG. 1B) and the one or more chip power models, schematics, and/or connectivity information.

Electrical simulation results may be generated at 506B by performing one or more electrical analyses (e.g., SPICE or SPICE like simulations) on the PDN-aware, multi-fabric system schematic. The PDN-aware, multi-fabric system schematic may be further augmented at 508B into a PDN-aware, thermally-aware multi-fabric system schematic with one or more thermal models. One or more thermal analyses may be performed on the PDN-aware, thermally-aware multi-fabric system schematic at 510B to generate thermal analysis results.

As described in FIG. 5A above, at least a part of the electrical analysis results generated at 506B may be forwarded to the one or more thermal analyses at 510B to update, for example, the thermal aspects of the thermally-aware, PDN aware, multi-fabric system fabric affected by the electrical behavior of the system; and at least a part of the thermal analysis results may also be relayed back to the one or more electrical analyses at 506B to update, for example, the electrical aspects of the thermally-aware, PDN aware, multi-fabric system fabric affected by the thermal behavior of the system.

Figure 6:
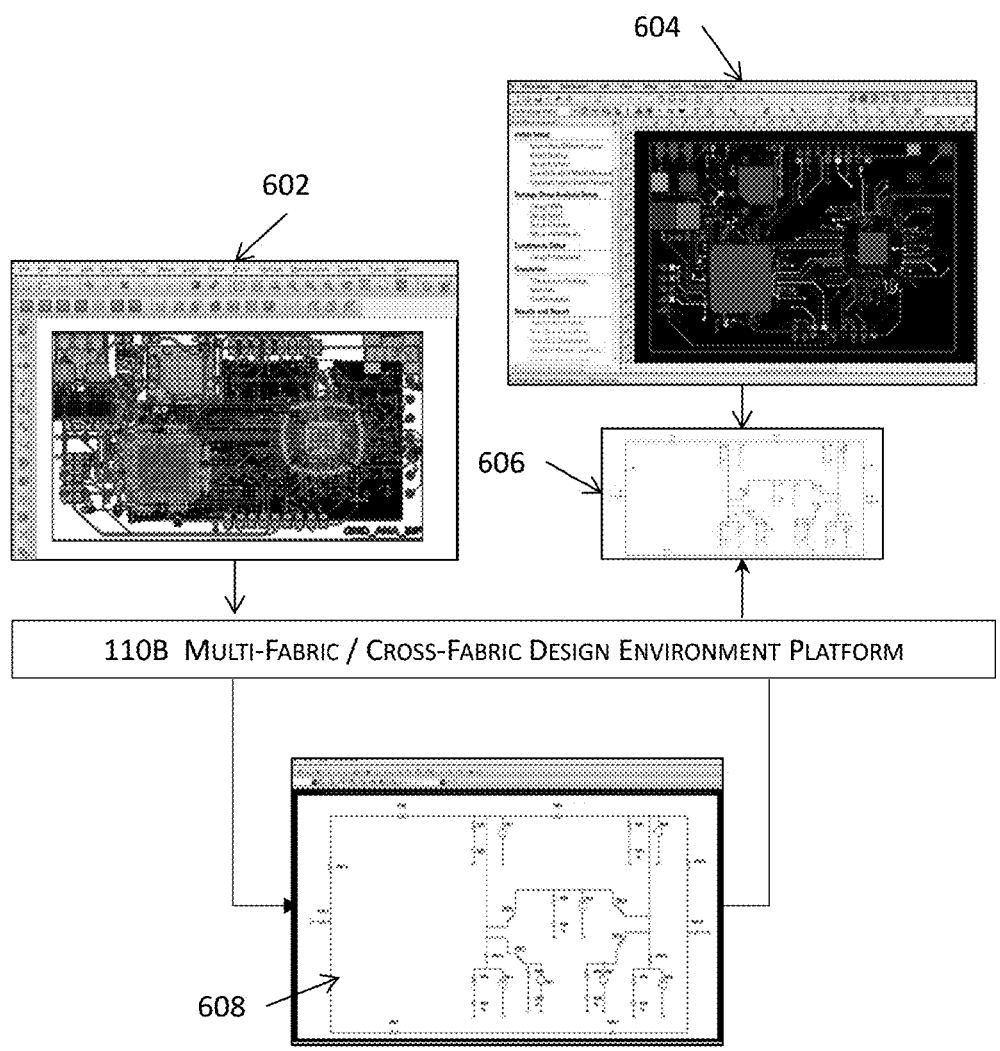
FIG. 6 illustrates another working example of generating a PDN-aware, thermal mode-aware multi-fabric system schematic in some embodiments.

FIG. 6 illustrates another working example of generating a thermally-aware, PDN-aware, thermal mode-aware multi-fabric system schematic in some embodiments. More specifically, this working example illustrates the generation of a thermally-aware, PDN aware full-system schematic that may be used to perform electrical and thermal multi-analyses for a circuit block of interest (e.g., an analog or mixed-signal die of interest) within the context of the entire system including the circuit block of interest various circuit components, blocks, cells, or dies surrounding the die of interest.

In this example, the multi-fabric, multi-fabric design environment platform 110B receives a package or system schematic 602 that may be extracted from a system or package layout. The system or package layout may include, for example, three-dimensional die stack, I/O (input/output) pad-rings or arrays, connectivity information, etc. in some of these embodiments. A system design 604 (e.g., a system schematic design) may be identified.

One or more thermal models 606 may be generated for the circuit components, blocks, cells, or dies surrounding the die of interest from the system design 604 and forwarded to the multi-fabric, multi-fabric design environment platform 110B. A fully distributed PDN model that includes one or more SPICE or SPICE-compatible models with I/O nets may also be generated at 606 from a layout and forwarded to the multi-fabric, multi-fabric design environment platform 110B. The PDN model also accounts for electromagnetic coupling effects between signals, power, and ground.

The layout from which the PDN model is generated may include, for example, a layout in GDSII or LEF/DEF or library exchange format/design exchange format. The multi-fabric, multi-fabric design environment platform 110B may then integrate or assemble the package or system schematic 602, the PDN model 606, and the one or more thermal models 606 into a thermally-aware, PDN-aware, multi-fabric full-system schematic 608 that is made aware of both the PDN model and the one or more thermal models.

The thermally-aware, PDN-aware, multi-fabric full-system schematic may then be used in various electrical and thermal analyses or simulations to provide full-system or chip-package-board-system static or transient analyses for the circuit block of interest within the context of the entire system. In some embodiments where the circuit block of interest is analyzed only in view of a smaller portion of the entire system, the process described herein may also process the smaller portion of the entire system to generate the needed chip power models and use the corresponding portion of the PDN model for the analyses of the analog or mixed-signal block of interest.

Figure 7:
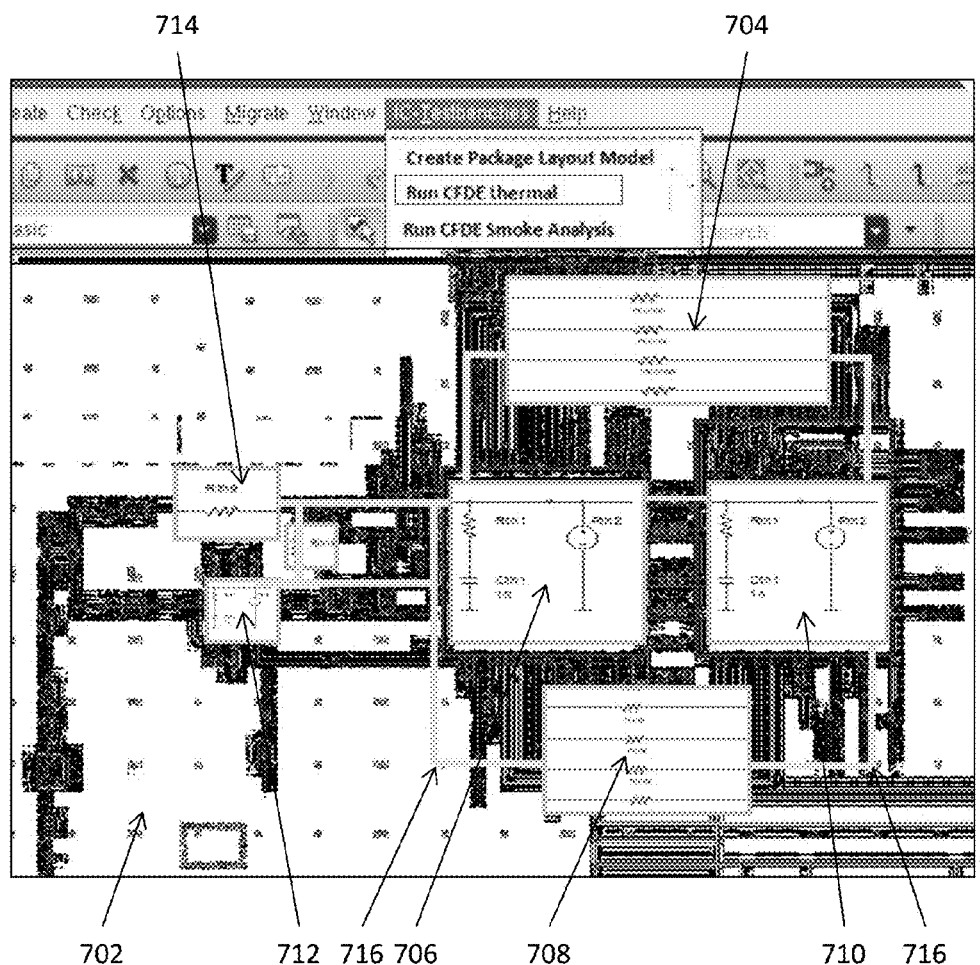
FIG. 7 illustrates an example of annotating thermal models for instances and nets in the generation of a PDN-aware, thermal mode-aware multi-fabric system schematic in some embodiments.

FIG. 7 illustrates an example of annotating thermal models for instances and nets in the generation of a PDN-aware, thermally-aware, multi-fabric system schematic in some embodiments. In this example illustrated in FIG. 7, the corresponding circuit components or blocks in the PDN-aware, thermally-aware, multi-fabric system schematic 702 are respectively annotated or replaced with thermal models 704, 706, 708, 710, 712, and 714. These thermal models are properly interconnected with traces or interconnects 716 that may be determined from the connectivity information. The interconnections or traces in the PDN-aware, thermally-aware, multi-fabric system schematic may be symbolically represented as shown in FIG. 7 in some embodiments or actually represented by using actual design data extracted from various layouts in some other embodiments.

In the foregoing specification, the disclosure of the application has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

System Architecture Overview

Figure 8:
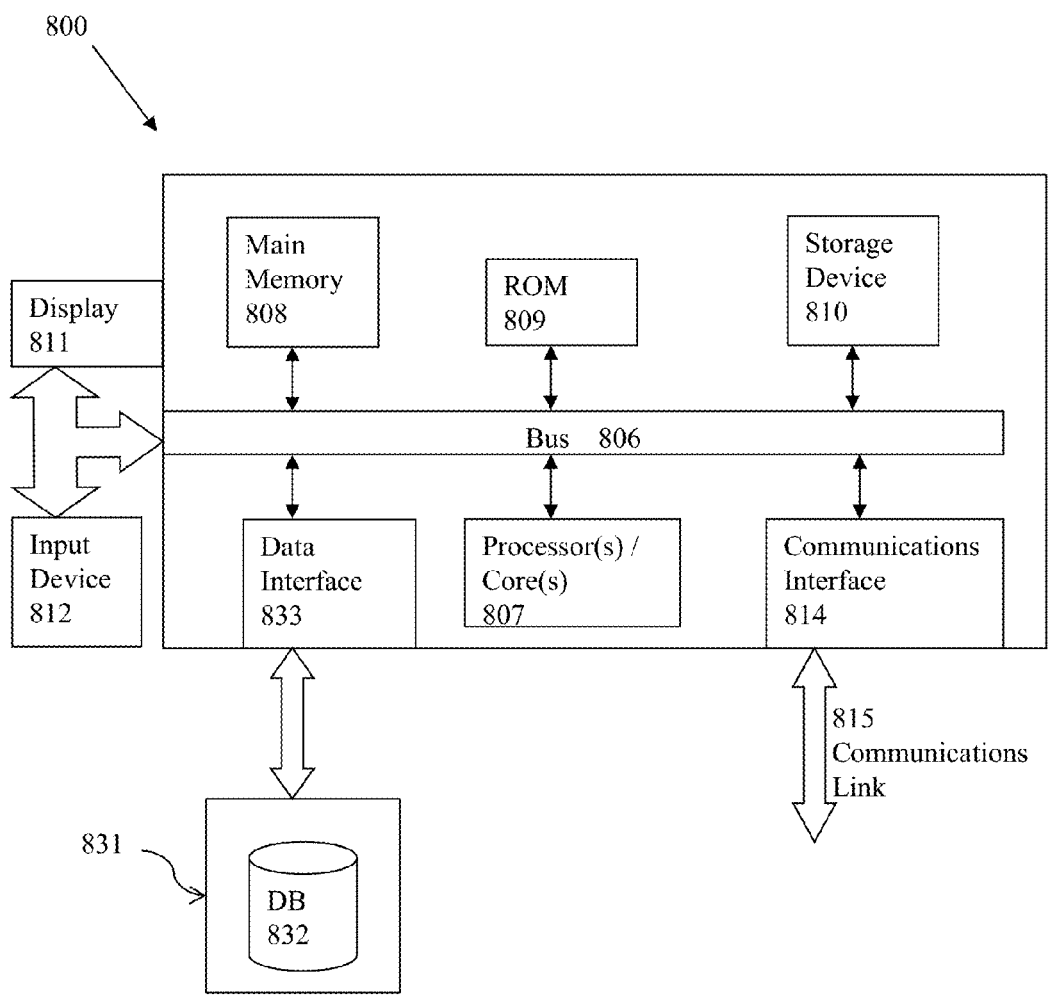
FIG. 8 illustrates a computerized system on which a method for implementing a multi-fabric mixed-signal electronic design spanning across multiple design fabrics with electrical and/or thermal analysis awareness may be implemented.

FIG. 8 illustrates a block diagram of a simplified illustration of a computing system 800 suitable for FIG. 8 illustrates a computerized system on which a method for implementing a multi-fabric mixed-signal electronic design spanning across multiple design fabrics with electrical and/or thermal analysis awareness as described in the preceding paragraphs with reference to various figures. Computer system 800 includes a bus 806 or other communication module for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment, computer system 800 performs specific operations by one or more processor or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 807, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. In an embodiment, the computer system 800 operates in conjunction with a data storage system 831, e.g., a data storage system 831 that includes a database 832 that is readily accessible by the computer system 800. The computer system 800 communicates with the data storage system 831 through a data interface 833. A data interface 833, which is coupled to the bus 806 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a multi-fabric mixed-signal electronic system design of an electronic system spanning across multiple design fabrics with electrical and/or thermal analysis awareness, comprising:
   extracting, at a plurality of extraction modules at least partially stored in memory and functioning in conjunction with one or more computer processors, a schematic design from a plurality of layouts in multiple design fabrics in a multi-fabric design environment platform;
   determining a power delivery network (PDN) model from the plurality of layouts;
   constructing a PDN-aware, multi-fabric full system schematic by assembling the power delivery network model and the schematic design into the PDN-aware, multi-fabric full system schematic; and
   updating the multi-fabric mixed-signal electronic system design based at least in part upon analysis results of analyzing a smaller portion of the multi-fabric mixed-signal electronic system design using at least a smaller power delivery network model derived from the power delivery network model.

2. The computer implemented method of claim 1, further comprising:
   identifying an IC package layout or a PCB layout from the plurality of layouts;
   identifying an analog or mixed-signal circuit block of interest; and
   extracting the schematic design for the analog or mixed-signal circuit block of interest from the IC package layout or the PCB layout in the plurality of layouts.

3. The computer implemented method of claim 2, further comprising:
   identifying a remaining portion of the multi-fabric mixed-signal electronic system design of a system excluding the analog or mixed-signal circuit block of interest; and
   determining one or more chip power models for the remaining portion of the multi-fabric mixed-signal electronic system design of the system.

4. The computer implemented method of claim 3, further comprising:
   generating or updating the PDN-aware, multi-fabric full system schematic by further assembling the one or more chip power models into the multi-fabric mixed-signal electronic system design of the system.

5. The computer implemented method of claim 2, further comprising:
   extracting connectivity information from the IC package layout or the PCB layout in the plurality of layouts; and
   generating or updating the PDN-aware, multi-fabric full system schematic by guiding an assembly of the power delivery network model and the schematic design into the multi-fabric mixed-signal electronic system design of the system using the connectivity information extracted from the IC package layout or the PCB layout in the plurality of layouts.

6. The computer implemented method of claim 1, further comprising:
   identifying an electrical analysis layout from the plurality of layouts;
   identifying one or more input/output (I/O) nets and one or more signal nets coupled to power or ground; and
   determining the power delivery network (PDN) model from the electrical analysis layout by constructing a simulation model that accounts for the one or more I/O nets and electromagnetic coupling effects between the one or more signal nets and power and/or ground.

7. The computer implemented method of claim 1, further comprising:
   generating analysis results by performing, at a schematic analysis or simulation mechanism, one or more system driven analyses on the PDN-aware, multi-fabric full system schematic;
   storing the analysis results at a first location of a non-transitory computer accessible storage medium;
   generating a revised multi-fabric mixed-signal electronic system design by revising the multi-fabric mixed-signal electronic system design with one or more electronic design automation (EDA) tools that natively process design data in one or more corresponding design fabrics; and
   storing the revised multi-fabric mixed-signal electronic system design into one or more relational databases.

8. The computer implemented method of claim 1, further comprising:
   identifying a PCB level or system level design for the multi-fabric mixed-signal electronic system design;
   identifying or constructing one or more thermal models from the PCB level or system level design; and generating or updating the PDN-aware, multi-fabric full system schematic by further assembling the one or more thermal models into the PDN-aware, multi-fabric full system schematic.

9. The computer implemented method of claim 8, further comprising:

generating electrical analysis results by performing, at a schematic analysis or simulation mechanism, one or more system driven electrical analyses on the PDN-aware, multi-fabric full system schematic that accounts for the one or more thermal models;

storing the electrical analysis results at a first location of a non-transitory computer accessible storage medium;

generating a first revised multi-fabric mixed-signal electronic system design by revising the multi-fabric mixed-signal electronic system design with one or more electronic design automation (EDA) tools that natively process design data in one or more corresponding design fabrics based in part or in whole upon the electrical analysis results; and storing the revised multi-fabric mixed-signal electronic system design into one or more relational databases.

10. The computer implemented method of claim 9, further comprising:

forwarding at least a part of the electrical analysis results to a thermal analysis mechanism;

updating the PDN-aware, multi-fabric full system schematic accounting for the one or more thermal models based in part or in whole upon the at least the part of the electrical analysis results;

generating thermal analysis results by performing, at a schematic analysis or simulation mechanism, one or more system driven thermal analyses on the PDN-aware, multi-fabric full system schematic that accounts for the one or more thermal models; and storing the thermal analysis results at a second location of a non-transitory computer accessible storage medium.

11. The computer implemented method of claim 10, further comprising:

determining whether the PDN-aware, multi-fabric full system schematic is to be revised in view of the thermal analysis results; and determining whether the PDN-aware, multi-fabric full system schematic is to be revised in view of the electrical analysis results.

12. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing a multi-fabric mixed-signal electronic system design of an electronic system spanning across multiple design fabrics with electrical and/or thermal analysis awareness, the set of acts comprising:

extracting, at a plurality of extraction mechanisms at least partially stored in memory and functioning in conjunction with one or more computer processors, a schematic design from a plurality of layouts in multiple design fabrics in a multi-fabric design environment platform;

determining a power delivery network (PDN) model from the plurality of layouts;

generating a PDN-aware, multi-fabric full system schematic by assembling the power delivery network model and the schematic design into the PDN-aware, multi-fabric full system schematic; and updating the multi-fabric mixed-signal electronic system design based at least in part upon analysis results of analyzing a smaller portion of the multi-fabric mixed-signal electronic system design using at least a smaller power delivery network model derived from the power delivery network model.

13. The article of manufacture of claim 12, the set of acts further comprising:

identifying an IC package layout or a PCB layout from the plurality of layouts;

identifying an analog or mixed-signal circuit block of interest; and extracting the schematic design for the analog or mixed-signal circuit block of interest from the IC package layout or the PCB layout in the plurality of layouts.

14. The article of manufacture of claim 13, the set of acts further comprising:

identifying a remaining portion of the multi-fabric mixed-signal electronic system design of a system excluding the analog or mixed-signal circuit block of interest; and determining one or more chip power models for the remaining portion of the multi-fabric mixed-signal electronic system design of the system.

15. The article of manufacture of claim 14, the set of acts further comprising:

generating or updating the PDN-aware, multi-fabric full system schematic by further assembling the one or more chip power models into the multi-fabric mixed-signal electronic system design of the system.

16. The article of manufacture of claim 12, the set of acts further comprising:

identifying an electrical analysis layout from the plurality of layouts;

identifying one or more input/output (I/O) nets and one or more signal nets coupled to power or ground; and determining the power delivery network (PDN) model from the electrical analysis layout by constructing a simulation model that accounts for the one or more I/O nets and electromagnetic coupling effects between the one or more signal nets and power and/or ground.

17. A system for implementing a multi-fabric mixed-signal electronic system design of an electronic system spanning across multiple design fabrics with electrical and/or thermal analysis awareness, comprising:

non-transitory computer accessible storage medium storing thereupon program code;

one or more extraction modules, at least a part of which is stored in the non-transitory computer accessible storage medium, that execute the program code to extract a schematic design from a plurality of layouts in multiple design fabrics in a multi-fabric design environment platform; and at least one processor coupled with the one or more extraction modules and executing the program code to determine a power delivery network (PDN) model from the plurality of layouts, to generate a PDN-aware, multi-fabric full system schematic by assembling the power delivery network model and the schematic design into the PDN-aware, multi-fabric full system schematic, and to update the multi-fabric mixed-signal electronic system design based at least in part upon analysis results of analyzing a smaller portion of the multi-fabric mixed-signal electronic system design using at least a smaller power delivery network model derived from the power delivery network model.

18. The system for claim 17, further comprising one or more modules that are at least partially stored in the non-transitory computer accessible storage medium and coupled with the at least one processor in executing the program code to generate analysis results by performing, at a schematic analysis or simulation module, one or more system driven analyses on the PDN-aware, multi-fabric full system schematic, to store the analysis results at a first location of a non-transitory computer accessible storage medium, to generate a revised multi-fabric mixed-signal electronic system design by revising the multi-fabric mixed-signal electronic system design with one or more electronic design automation (EDA) tools that natively process design data in one or more corresponding design fabrics, and to store the revised multi-fabric mixed-signal electronic system design into one or more relational databases.

19. The system for claim 17, further comprising one or more modules that are at least partially stored in the non-transitory computer accessible storage medium and coupled with the at least one processor in executing the program code to identify a PCB level or system level design for the multi-fabric mixed-signal electronic system design, to identify or construct one or more thermal models from the PCB level or system level design, and to generate or update the PDN-aware, multi-fabric full system schematic by further assembling the one or more thermal models into the PDN-aware, multi-fabric full system schematic.

20. The system for claim 17, further comprising one or more modules that are at least partially stored in the non-transitory computer accessible storage medium and coupled with the at least one processor in executing the program code to generate electrical analysis results by performing, at a schematic analysis or simulation mechanism, one or more system driven electrical analyses on the PDN-aware, multi-fabric full system schematic that accounts for the one or more thermal models, to store the electrical analysis results at a first location of a non-transitory computer accessible storage medium, to generate a first revised multi-fabric mixed-signal electronic system design by revising the multi-fabric mixed-signal electronic system design with one or more electronic design automation (EDA) tools that natively process design data in one or more corresponding design fabrics based in part or in whole upon the electrical analysis results, and to store the revised multi-fabric mixed-signal electronic system design into one or more relational databases.

* * * * *